(12) United States Patent
Lu et al.

(10) Patent No.: US 11,218,586 B2
(45) Date of Patent: Jan. 4, 2022

(54) METHOD FOR CONTROLLING SCREEN OF MOBILE TERMINAL, AND APPARATUS

(71) Applicant: Honor Device Co., Ltd., Shenzhen (CN)

(72) Inventors: Changxue Lu, Chengdu (CN); Jinhua Bai, Nanjing (CN); Liudong Xiong, Nanjing (CN); Jinsong Zhou, Nanjing (CN); Yide Wei, Nanjing (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 16/332,190

(22) PCT Filed: Sep. 9, 2016

(86) PCT No.: PCT/CN2016/098601
§ 371 (c)(1),
(2) Date: Mar. 11, 2019

(87) PCT Pub. No.: WO2018/045569
PCT Pub. Date: Mar. 15, 2018

(65) Prior Publication Data
US 2019/0268463 A1 Aug. 29, 2019

(51) Int. Cl.
*H04M 1/72454* (2021.01)
*G06F 3/01* (2006.01)
(Continued)

(52) U.S. Cl.
CPC ...... *H04M 1/72454* (2021.01); *G06F 1/3206* (2013.01); *G06F 1/3265* (2013.01);
(Continued)

(58) Field of Classification Search
CPC .............. H04M 1/72569; H04M 1/02; H04M 2250/12; G06F 1/3265; G06F 1/3206;
(Continued)

(56) References Cited

U.S. PATENT DOCUMENTS 10,552,514 B1 * 2/2020 Marcum ............... G06F 40/103
2013/0055001 A1 2/2013 Jeong et al.
(Continued)

FOREIGN PATENT DOCUMENTS

CN 102662473 A 9/2012
CN 103677267 A 3/2014
(Continued)

OTHER PUBLICATIONS

Machine Translation and Abstract of Chinese Publication No. CN103677267, Mar. 26, 2014, 16 pages.
(Continued)

*Primary Examiner* — Marcos L Torres
(74) *Attorney, Agent, or Firm* — Conley Rose, P.C.

(57) ABSTRACT

A method includes obtaining, by a mobile terminal, a motion parameter of the mobile terminal, determining whether the motion parameter meets a pick-up parameter threshold or a put-down parameter threshold, determining that the mobile terminal is picked up when the motion parameter meets the pick-up parameter threshold, obtaining a sight line parameter of a user, and switching the screen to an on state when a visual center of the user is on a screen of the mobile terminal and the screen is in an off state.

16 Claims, 10 Drawing Sheets

(51) Int. Cl.
*H04M 1/02* (2006.01)
*G06F 3/0346* (2013.01)
*G06F 1/3206* (2019.01)
*G06F 1/3234* (2019.01)
*H04W 52/02* (2009.01)

(52) U.S. Cl.
CPC ............ *G06F 3/013* (2013.01); *G06F 3/0346* (2013.01); *H04M 1/02* (2013.01); *H04M 2250/12* (2013.01); *H04W 52/0254* (2013.01)

(58) Field of Classification Search
CPC ...... G06F 3/013; G06F 1/1692; G06F 1/1686; G06F 1/3231; G06F 1/3218; G06F 1/3215; G06F 1/1643; G06F 1/1694; H04W 52/0254; H04W 3/0346
See application file for complete search history.

(56) References Cited

U.S. PATENT DOCUMENTS

| | | | |
|---|---|---|---|
| 2014/0157210 A1* | 6/2014 | Katz | G06F 3/017 715/863 |
| 2014/0267034 A1 | 9/2014 | Krulce et al. | |
| 2015/0334658 A1* | 11/2015 | Kulas | H04M 1/72563 455/566 |
| 2016/0018872 A1* | 1/2016 | Tu | G06F 1/3234 345/173 |
| 2016/0070311 A1 | 3/2016 | Geva | |

FOREIGN PATENT DOCUMENTS

| | | |
|---|---|---|
| CN | 104049759 A | 9/2014 |
| CN | 104102435 A | 10/2014 |
| CN | 104536569 A | 4/2015 |
| CN | 104656899 A | 5/2015 |
| CN | 104679245 A | 6/2015 |
| CN | 103458111 B | 9/2015 |
| CN | 105144032 A | 12/2015 |
| EP | 2450872 A1 | 5/2012 |
| EP | 2827226 A2 | 1/2015 |
| JP | 2008209610 A | 9/2008 |

OTHER PUBLICATIONS

Foreign Communication From A Counterpart Application, European Application No. 16915503.3, Extended European Search Report dated Jul. 11, 2019, 11 pages.
Machine Translation and Abstract of Chinese Publication No. CN102662473, Sep. 12, 2012, 21 pages.
Machine Translation and Abstract of Chinese Publication No. CN104536569, Apr. 22, 2015, 25 pages.
Machine Translation and Abstract of Chinese Publication No. CN104656899, May 27, 2015, 24 pages.
Machine Translation and Abstract of Chinese Publication No. CN104679245, Jun. 3, 2015, 24 pages.
Machine Translation and Abstract of Japanese Publication No. JP2008209610, Sep. 11, 2008, 13 pages.
Foreign Communication From A Counterpart Application, PCT Application No. PCT/CN2016/098601, English Translation of International Search Report dated May 27, 2017, 2 pages.
Foreign Communication From A Counterpart Application, PCT Application No. PCT/CN2016/098601, English Translation of Written Opinion dated May 27, 2017, 5 pages.
Machine Translation and Abstract of Chinese Publication No. CN105144032, Dec. 9, 2015, 19 pages.
Foreign Communication From A Counterpart Application, Chinese Application No. 201680086617.7, Chinese Office Action dated Sep. 24, 2019, 11 pages.
Machine Translation and Abstract of Chinese Publication No. CN103458111, Sep. 2, 2015, 6 pages.

* cited by examiner

METHOD FOR CONTROLLING SCREEN OF MOBILE TERMINAL, AND APPARATUS

CROSS-REFERENCE TO RELATED APPLICATIONS

This application is a U.S. National Stage of International Patent Application No. PCT/CN2016/098601 filed on Sep. 9, 2016, which is hereby incorporated by reference in its entirety.

TECHNICAL FIELD

The present invention relates to the field of communications technologies, and in particular, to a method for controlling a screen of a mobile terminal, and an apparatus.

BACKGROUND

With continuous development of communications technologies, more users use mobile terminals. Generally, before using a mobile terminal, a user needs to turn on a screen of the mobile terminal, and may turn off the screen of the mobile terminal after stopping using the mobile terminal.

Currently, it may be detected whether a location of the mobile terminal changes, to determine whether the user needs to use or stop using the mobile terminal. Specifically, when the location of the mobile terminal changes, it is considered that the user needs to use or stop using the mobile terminal. Then, a status of the screen of the mobile terminal is determined. When the screen of the mobile terminal is in an off state, turn on the screen of the mobile terminal, or when the screen of the mobile terminal is in an on state, turn off the screen of the mobile terminal.

However, because when the location of the mobile terminal changes, it does not necessarily mean that the user needs to use or stop using the mobile terminal, accuracy of controlling, by using the foregoing method, a screen of a mobile terminal to be turned on or turned off is relatively low.

SUMMARY

This application provides a method for controlling a screen of a mobile terminal, and an apparatus, to resolve a prior-art problem of relatively low accuracy of controlling a screen of a mobile terminal to be turned on or turned off.

To achieve the foregoing objective, the following technical solutions are used in this application.

According to a first aspect, a method for controlling a screen of a mobile terminal is provided. The method includes: obtaining a current motion parameter that is of a mobile terminal and that is used to determine whether the mobile terminal is picked up or put down; determining, when the motion parameter meets a pick-up parameter threshold, that the mobile terminal is picked up; after it is determined that the mobile terminal is picked up, obtaining a sight line parameter of a user that is used to determine whether a visual center of the user is on a screen of the mobile terminal; and when it is determined that the visual center of the user is on the screen and the screen is in an off state, switching the screen to an on state.

In this application, because it may be determined, based on a motion status parameter of the mobile terminal, whether the mobile terminal is picked up by the user, and it may be further determined, by using the sight line parameter, whether the visual center of the user is on the screen, it may be accurately determined whether the user needs to use the mobile terminal, to accurately control the screen of the mobile terminal to be in the on state, so that accuracy of controlling the screen of the mobile terminal to be turned on can be improved.

In a first optional implementation of the first aspect the method for controlling a screen of a mobile terminal in this application further includes: when the current motion parameter of the mobile terminal meets a put-down parameter threshold, determining that the mobile terminal is put down; obtaining a sight line parameter of the user after it is determined that the mobile terminal is put down; and when it is determined that the visual center of the user is not on the screen of the mobile terminal and the screen is in the on state, switching the screen to the off state.

In this application, because it may be determined, based on the motion status parameter of the mobile terminal, whether the mobile terminal is put down by the user, and it may be further determined, by using the sight line parameter, whether the visual center of the user is on the screen, it may be accurately determined whether the user stops using the mobile terminal, to accurately control the screen of the mobile terminal to be in the off state, so that accuracy of controlling the screen of the mobile terminal to be turned off can be improved.

In a second optional implementation of the first aspect, the method for switching the screen (namely, the screen of the mobile terminal) to the off state includes: first, switching the screen to a dimmed state; then obtaining a sight line parameter of the user; and when it is determined that the visual center of the user is constantly not on the screen within a preset hysteresis time, switching the screen to the off state after the hysteresis time.

In this application, when the screen of the mobile terminal needs to be switched from the on state to the off state, to further improve accuracy of controlling the screen of the mobile terminal to be turned off, the screen of the mobile terminal first may be switched to the dimmed state and remain in the dimmed state for a time period (for example, the preset hysteresis time), and the sight line parameter of the user may be constantly obtained within the hysteresis time, to determine whether the visual center of the user is on the screen of the mobile terminal. If it is determined that the visual center of the user is constantly not on the screen of the mobile terminal within the hysteresis time, it indicates that the user needs to stop using the mobile terminal, and the screen of the mobile terminal may be switched from the dimmed state to the off state after the hysteresis time.

In a third optional implementation of the first aspect, the method for controlling a screen of a mobile terminal in this application further includes: when it is determined that the visual center of the user is not on the screen of the mobile terminal and the screen is in the on state, switching the screen to the dimmed state; obtaining a sight line parameter of the user; and when it is determined that the visual center of the user is back on the screen within the preset hysteresis time, switching the screen to the on state.

In this application, when the screen of the mobile terminal needs to be switched from the on state to the off state, to further improve accuracy of controlling the screen of the mobile terminal to be turned off, the screen of the mobile terminal first may be switched to the dimmed state and remain in the dimmed state for a time period (for example, the preset hysteresis time), and the sight line parameter of the user may be constantly obtained within the hysteresis time. If it is determined that the visual center of the user is back on the screen of the mobile terminal within the preset hysteresis time, it indicates that the user needs to continue to use the mobile terminal, and the screen of the mobile terminal may be directly switched from the dimmed state to the on state.

In a fourth optional implementation of the first aspect, after the obtaining a current motion parameter of a mobile terminal, the method for controlling a screen of a mobile terminal in this application further includes: determining a current motion status of the mobile terminal based on the motion parameter; and determining, based on the motion status, the pick-up parameter threshold and the put-down parameter threshold that correspond to the motion status. The motion status includes a first motion state in which a moving speed of the mobile terminal is A, a second motion state in which the moving speed of the mobile terminal is B, and a third motion state in which the moving speed of the mobile terminal is C, where A<B<C.

In this application, because the mobile terminal may determine, based on the motion parameter, the pick-up parameter threshold and the put-down parameter threshold that correspond to the motion status of the mobile terminal, the pick-up parameter threshold and the put-down parameter threshold can be determined more accurately, so as to more accurately determine whether the mobile terminal is picked up or put down.

In a fifth optional implementation of the first aspect, the method for determining, when the current motion parameter of the mobile terminal meets a pick-up parameter threshold, that the mobile terminal is picked up includes: when the motion parameter meets the pick-up parameter threshold and it is determined that the screen of the mobile terminal is not blocked, determining that the mobile terminal is picked up.

In this application, when the motion parameter meets the pick-up parameter threshold, to further improve accuracy of determining that the mobile terminal is picked up, it may be further determined whether the screen of the mobile terminal is blocked. If the screen of the mobile terminal is not blocked, it indicates that the user probably needs to use the mobile terminal, and it may be determined that the mobile terminal is picked up, or if the screen of the mobile terminal is blocked, it indicates that the user probably does not need to use the mobile terminal, and the method for controlling a screen of a mobile terminal in the first aspect may be performed.

In a sixth optional implementation of the first aspect, the method for controlling a screen of a mobile terminal in this application further includes: when the current motion parameter of the mobile terminal does not meet the pick-up parameter threshold and it is determined that the screen of the mobile terminal is switched from being blocked to not being blocked, adjusting the pick-up parameter threshold; and when the motion parameter meets a pick-up parameter threshold obtained after the adjustment, determining that the mobile terminal is picked up.

That the screen of the mobile terminal is switched from being blocked to not being blocked may be determined by using a result of determining, by the mobile terminal, whether the screen of the mobile terminal is currently blocked and a result of previously determining, by the mobile terminal, whether the screen of the mobile terminal is blocked. For example, when the mobile terminal determines that the screen of the mobile terminal is not blocked currently and the mobile terminal previously determines that the screen of the mobile terminal is blocked, the mobile terminal may determine that the screen of the mobile terminal is switched from being blocked to not being blocked.

In this application, if the mobile terminal determines that the screen of the mobile terminal is switched from being blocked to not being blocked, it indicates that the user probably needs to use the mobile terminal. However, because the current motion parameter of the mobile terminal does not meet the current pick-up parameter threshold, to further improve accuracy of controlling the screen to be turned on, the current pick-up parameter threshold may be adjusted appropriately, so that the current motion parameter of the mobile terminal can meet the pick-up parameter threshold obtained after the adjustment.

The method for adjusting the pick-up parameter threshold may include: increasing a first angle range in the current pick-up parameter threshold, and/or decreasing a first moving speed threshold in the current pick-up parameter threshold, and/or decreasing a first moving height threshold in the current pick-up parameter threshold.

In a seventh optional implementation of the first aspect, the method for controlling a screen of a mobile terminal in this application further includes: when the current motion parameter of the mobile terminal does not meet the pick-up parameter threshold and it is determined that the screen of the mobile terminal is not switched from being blocked to not being blocked and that the mobile terminal is switched from not being held to being held, determining that the mobile terminal is picked up.

In this application, when the motion parameter of the mobile terminal does not meet the pick-up parameter threshold obtained after the adjustment, or the screen of the mobile terminal is not switched from being blocked to not being blocked, to further improve accuracy of controlling the screen to be turned on, the mobile terminal may further determine whether the mobile terminal is switched from not being held to being held, to determine whether the user needs to use the mobile terminal. If the mobile terminal determines that the mobile terminal is switched from not being held to being held, it indicates that the user probably needs to use the mobile terminal, or if the mobile terminal determines that the mobile terminal is not switched from not being held to being held, it indicates that the user probably does not need to use the mobile terminal.

In an eighth optional implementation of the first aspect, that the mobile terminal is switched from not being held to being held may be determined by using the following method: obtaining at least two sensing parameter values that are used to determine whether the mobile terminal is held; calculating an eigenvalue of the at least two sensing parameter values based on the at least two sensing parameter values; and when the eigenvalue is greater than or equal to a holding decision threshold, and the eigenvalue obtained after previous calculation is less than the holding decision threshold, determining that the mobile terminal is switched from not being held to being held.

The at least two sensing parameter values may be obtained by using at least two sensing units disposed in the mobile terminal. During hardware implementation, the at least two sensing units may be disposed on two sides of a rear face of the mobile terminal. In one possible implementation, a plurality of sensing units may be separately disposed at intervals on the two sides of the rear face of the mobile terminal (when two sensing units are disposed in the mobile terminal, one sensing unit may be disposed on each of the two sides of the rear face of the mobile terminal). The sensing unit may be implemented by a capacitive sensor.

In this application, when the eigenvalue of the obtained at least two sensing parameter values is greater than or equal to the holding decision threshold, it may be determined that the mobile terminal is held, and when the eigenvalue is less than the holding decision threshold, it may be determined that the mobile terminal is not held. Therefore, it may be determined whether the eigenvalue is greater than or equal to the holding decision threshold, to determine whether the mobile terminal is held.

In this application, it may be determined, with reference to a relationship between the holding decision threshold and the eigenvalue that is of at least two sensing parameter values and that is obtained after previous calculation and a relationship between the holding decision threshold and the eigenvalue that is of at least two sensing parameter values and that is obtained after current calculation, whether the mobile terminal is switched from not being held to being held or switched from being held to not being held. Specifically, when the eigenvalue obtained after current calculation of the mobile terminal is greater than or equal to the holding decision threshold, and the eigenvalue obtained after previous calculation is less than the holding decision threshold (that is, the relationship between the eigenvalue obtained after current calculation and the holding decision threshold is different from the relationship between the eigenvalue obtained after previous calculation and the holding decision threshold, for example, the eigenvalue obtained after previous calculation is less than the holding decision threshold, and the eigenvalue obtained after current calculation is greater than or equal to the holding decision threshold), the mobile terminal may determine that the mobile terminal is switched from not being held to being held. Therefore, it can be accurately determined that the user probably needs to use the mobile terminal.

Correspondingly, when the eigenvalue obtained after current calculation of the mobile terminal is less than the holding decision threshold and the eigenvalue obtained after previous calculation is greater than or equal to the holding decision threshold, the mobile terminal may determine that the mobile terminal is switched from being held to not being held.

In a ninth optional implementation of the first aspect, the method for controlling a screen of a mobile terminal in this application further includes: when the current motion parameter of the mobile terminal does not meet the put-down parameter threshold and it is determined that the mobile terminal is switched from being held to not being held, determining that the mobile terminal is put down.

In this application, when the motion parameter of the mobile terminal does not meet the put-down parameter threshold, to further improve accuracy of controlling the screen to be turned off, the mobile terminal may further determine whether the mobile terminal is switched from being held to not being held, to determine whether the user needs to use the mobile terminal. If the mobile terminal determines that the mobile terminal is switched from being held to not being held, it indicates that the user probably does not need to use the mobile terminal, and it is determined that the mobile terminal is put down or if the mobile terminal determines that the mobile terminal is not switched from being held to not being held, it indicates that the user needs to use the mobile terminal.

In a tenth optional implementation of the first aspect, the method for obtaining a sight line parameter of the user after it is determined that the mobile terminal is put down includes: obtaining the sight line parameter of the user after it is determined that the mobile terminal is put down and that the screen of the mobile terminal is not blocked.

In this application, after it is determined that the mobile terminal is put down, to further improve accuracy of controlling the screen to be turned off, it may be determined whether the screen of the mobile terminal is blocked and when it is determined that the screen of the mobile terminal is blocked, it is determined that the user does not need to use the mobile terminal, so that the screen of the mobile terminal can be directly switched to the off state without a need to obtain the sight line parameter of the user. Therefore, power consumption of the mobile terminal can be further reduced. Alternatively, when it is determined that the screen of the mobile terminal is not blocked, the screen of the mobile terminal first may be switched to the dimmed state and remain in the dimmed state for the time period (for example, the preset hysteresis time), and the sight line parameter of the user may be constantly obtained within the hysteresis time, to determine whether the visual center of the user is on the screen of the mobile terminal. If it is determined that the visual center of the user is constantly not on the screen of the mobile terminal within the hysteresis time, it indicates that the user needs to stop using the mobile terminal, and the screen of the mobile terminal may be switched from the dimmed state to the off state after the hysteresis time.

According to a second aspect, a mobile terminal is provided. The mobile terminal includes an obtaining module, a determining module, and a switching module. The obtaining module is configured to obtain a current motion parameter that is of the mobile terminal and that is used to determine whether the mobile terminal is picked up or put down, and configured to: after the determining module determines that the mobile terminal is picked up, obtain a sight line parameter of a user that is used to determine whether a visual center of the user is on a screen of the mobile terminal; the determining module is configured to: when the motion parameter obtained by the obtaining module meets a pick-up parameter threshold, determine that the mobile terminal is picked up; and the switching module is configured to: when it is determined that the visual center of the user is on the screen of the mobile terminal and the screen is in an off state, switch the screen to an on state. That the visual center of the user is on the screen is determined by using the sight line parameter of the user obtained by the obtaining module.

In a first optional implementation of the second aspect, in the mobile terminal in this application, the determining module is further configured to: when the current motion parameter of the mobile terminal meets a put-down parameter threshold, determine that the mobile terminal is put down; the obtaining module is further configured to obtain a sight line parameter of the user after the determining module determines that the mobile terminal is put down; and the switching module is further configured to: when it is determined that the visual center of the user is not on the screen of the mobile terminal and the screen is in the on state, switch the screen to the off state. That the visual center of the user is not on the screen is determined by using the sight line parameter of the user obtained by the obtaining module.

In a second optional implementation of the second aspect, in the mobile terminal in this application, the switching module is specifically configured to: switch the screen of the mobile terminal to a dimmed state; instruct the obtaining module to obtain a sight line parameter of the user; when it is determined that the visual center of the user is constantly not on the screen within a preset hysteresis time, switch the screen to the off state after the hysteresis time.

In a third optional implementation of the second aspect; in the mobile terminal in this application, the switching module is further configured to: when it is determined that the visual center of the user is not on the screen of the mobile terminal and the screen is in the on state, switch the screen to the dimmed state; instruct the obtaining module to obtain a sight line parameter of the user; and when it is determined that the visual center of the user is back on the screen within the hysteresis time, switch the screen to the on state.

In a fourth optional implementation of the second aspect, in the mobile terminal in this application, the determining module is further configured to: after the obtaining module obtains the current motion parameter of the mobile terminal, determine a current motion status of the mobile terminal based on the motion parameter obtained by the obtaining module; determine, based on the motion status, the pick-up parameter threshold and the put-down parameter threshold that correspond to the motion status, where the motion status includes a first motion state in which a moving speed of the mobile terminal is A, a second motion state in which the moving speed of the mobile terminal is B, and a third motion state in which the moving speed of the mobile terminal is C, where A<B<C.

In a fifth optional implementation of the second aspect, in the mobile terminal in this application, the determining module is specifically configured to: when the current motion parameter of the mobile terminal obtained by the obtaining unit meets the pick-up parameter threshold and it is determined that the screen is not blocked, determine that the mobile terminal is picked up.

In a sixth optional implementation of the second aspect, the mobile terminal in this application further includes an adjustment module, where the adjustment module is configured to: when the current motion parameter of the mobile terminal obtained by the obtaining module does not meet the pick-up parameter threshold and the determining module determines that the screen of the mobile terminal is switched from being blocked to not being blocked, adjust the pick-up parameter threshold; and the determining module is specifically configured to: when the motion parameter obtained by the obtaining module meets a pick-up parameter threshold obtained after the adjustment performed by the adjustment module, determine that the mobile terminal is picked up.

In a seventh optional implementation of the second aspect, in the mobile terminal in this application, the determining module is further configured to: when the current motion parameter of the mobile terminal obtained by the obtaining unit does not meet the pick-up parameter threshold and it is determined that the screen of the mobile terminal is not switched from being blocked to not being blocked and that the mobile terminal is switched from not being held to being held, determine that the mobile terminal is picked up.

In an eighth optional implementation of the second aspect, in the mobile terminal in this application, that the mobile terminal is switched from not being held to being held may be determined by the determining module. The determining module is specifically configured to: instruct the obtaining module to obtain at least two sensing parameter values that are used to determine whether the mobile terminal is held; calculate an eigenvalue of the at least two sensing parameter value based on the at least two sensing parameter values obtained by the obtaining module; and when the eigenvalue is greater than or equal to a holding decision threshold, and the eigenvalue obtained after previous calculation is less than the holding decision threshold, determine that the mobile terminal is switched from not being held to being held.

In a ninth optional implementation of the second aspect, in the mobile terminal in this application, the determining module is further configured to: when the current motion parameter of the mobile terminal obtained by the obtaining module does not meet the put-down parameter threshold and it is determined that the mobile terminal is switched from being held to not being held, determine that the mobile terminal is put down.

In a tenth optional implementation of the second aspect, in the mobile terminal in this application, the obtaining module is specifically configured to obtain the sight line parameter of the user after the determining module determines that the mobile terminal is put down and that the screen of the mobile terminal is not blocked.

In the first aspect and the second aspect, the current motion parameter of the mobile terminal includes at least one of an angle, the moving speed of the mobile terminal, or a moving height of the mobile terminal, and the angle is an angle between a plane of the screen of the mobile terminal and a plane of the eyes of the user. The pick-up parameter threshold includes at least one of a first angle range, a first moving speed threshold, or a first moving height threshold. The put-down parameter threshold includes at least one of a second angle range, a second moving speed threshold, or a second moving height threshold. That the current motion parameter of the mobile terminal meets the pick-up parameter threshold includes at least one of the following: the angle falls within the first angle range, the moving speed is greater than or equal to the first moving speed threshold, or the moving height is greater than or equal to the first moving height threshold. That the current motion parameter of the mobile terminal meets the put-down parameter threshold includes at least one of the following: the angle falls within the second angle range, the moving speed is greater than or equal to the second moving speed threshold, or the moving height is greater than or equal to the second moving height threshold.

In this application, that the current motion parameter of the mobile terminal meets the pick-up parameter threshold may be determined by determining at least one of the following: the angle between the plane of the screen of the mobile terminal and the plane of the eyes of the user is in the first angle range, the moving speed of the mobile terminal is greater than or equal to the first moving speed threshold, and that the moving height of the mobile terminal is greater than or equal to the first moving height threshold. In addition, that the current motion parameter of the mobile terminal meets the put-down parameter threshold may be determined by determining at least one of the following: the angle between the plane of the screen of the mobile terminal and the plane of the eyes of the user is in the second angle range, the moving speed of the mobile terminal is greater than or equal to the second moving speed threshold, or the moving height of the mobile terminal is greater than or equal to the second moving height threshold. Therefore, it can be accurately determined whether the current motion parameter of the mobile terminal meets the pick-up parameter threshold or the put-down parameter threshold.

In this application, the modules in the second aspect may be further configured to perform corresponding method steps in the first aspect. In addition, the second aspect may further include other modules configured to perform other method steps in the first aspect.

For technical effects of the second aspect and the optional implementations of the second aspect, refer to the related descriptions of the technical effects of the first aspect and the optional implementations of the first aspect, and details are not described herein again.

According to a third aspect, this application provides a mobile terminal. The mobile terminal includes a processor, a transceiver, and a memory. The processor, the transceiver, and the memory are connected in a coupling manner by using a bus. The memory is configured to store a computer execution instruction, and when the mobile terminal runs, the processor executes the computer execution instruction stored in the memory, so that the mobile terminal performs the method for controlling a screen of a mobile terminal in the first aspect and the optional implementations of the first aspect. For the specific method for controlling a screen of a mobile terminal, refer to the related descriptions in the first aspect and the optional implementations of the first aspect, and details are not described herein again.

According to a fourth aspect, this application provides a computer readable storage medium. The computer readable storage medium stores one or more programs. The one or more programs include a computer execution instruction. When a processor of a mobile terminal executes the computer execution instruction, the mobile terminal performs the method for controlling a screen of a mobile terminal in any one of the first aspect and the optional implementations of the first aspect. For the specific method for controlling a screen of a mobile terminal, refer to the related descriptions in the first aspect and the optional implementations of the first aspect, and details are not described herein again.

For technical effects of the third aspect and the fourth aspect, refer to the related descriptions of the technical effects of the first aspect and the optional implementations of the first aspect, and details are not described herein again.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention.

DESCRIPTION OF EMBODIMENTS

Figure 1:
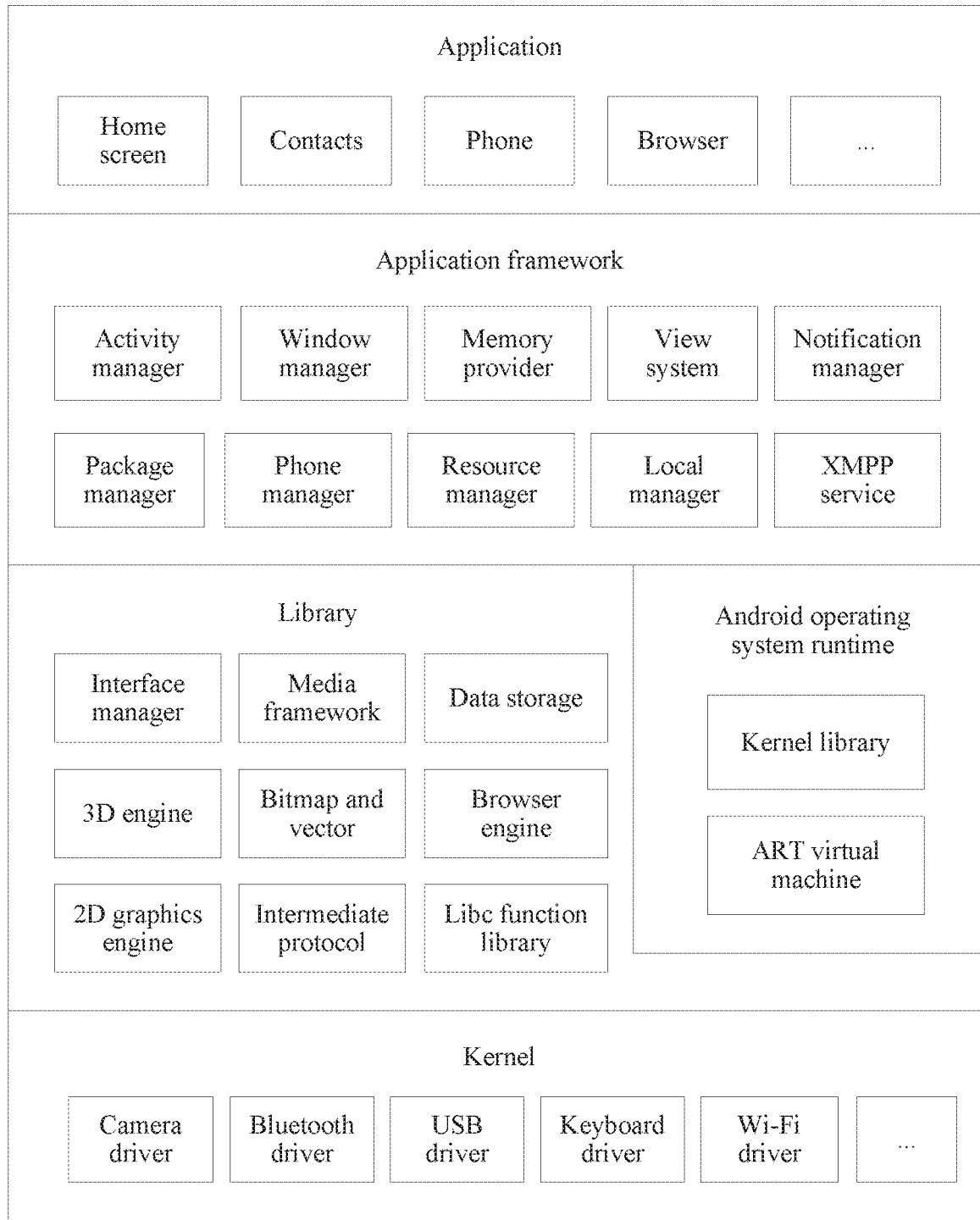
FIG. 1 is a schematic diagram of a system architecture of an Android operating system according to an embodiment of the present invention.

The term "and/or" in this specification describes only an association relationship for describing associated objects and represents that three relationships may exist. For example, A and/or B may represent the following three cases: Only A exists, both A and B exist, and only B exists. The character "/" in this specification indicates an "or" relationship between the associated objects. For example, A/B indicates A or B.

In the specification and claims of the present invention, the terms "first", "second", "third", and the like are intended to distinguish between different objects but do not indicate a particular order of the objects. For example, a first motion state, a second motion state, a third motion state, and the like are intended to distinguish between different motion states but do not indicate a particular order of the motion states.

The term "example" or "for example" in the embodiments of the present invention means used as an example, an illustration, or a description. Any embodiment or design scheme described as "example" or "for example" in the embodiments of the present invention should not be explained as being more preferred or having more advantages than another embodiment or design scheme. Exactly, use of the term "example" or "for example" is intended to present a concept in a specific manner.

In the descriptions of the present invention, unless otherwise specified, "a plurality of" means at least two. For example, a plurality of sensing units mean at least two sensing units.

The following clearly describes the technical solutions of the embodiments of the present invention with reference to the accompanying drawings in the embodiments of the present invention. Apparently, the described embodiments are merely some but not all of the embodiments of the present invention.

First, some concepts that may be used in the embodiments of the present invention are described.

1. A status of a screen of a mobile terminal in the embodiments of the present invention is described. The status of the screen of the mobile terminal in the embodiments of the present invention includes an on state, an off state, and a dimmed state.

The on state is also referred to as an awake state, and is a state in which luminance of the screen of the mobile terminal is preset luminance. The preset luminance may be set by a user, or may be set by the mobile terminal by default. For example, in actual application, if the luminance of the screen of the mobile terminal is zero, when the user needs to use the mobile terminal, the status of the screen of the mobile terminal after the user presses a power key of the mobile terminal is the on state.

The off state is also referred to as a sleep state, and is a state in which the luminance of the screen of the mobile terminal is zero. For example; in actual application, when the user stops using the mobile terminal, the status of the screen of the mobile terminal after the user presses the power key of the mobile terminal is the off state.

The dimmed state is a state of the screen in which the luminance of the screen of the mobile terminal is between luminance of the screen in the on state and luminance of the screen in the off state. The dimmed state is a transit state when the screen of the mobile terminal is to be switched from the on state to the off state. For example, in actual application, after the user stops using the mobile terminal, if the mobile terminal does not detect an operation of the user within a first preset time, the screen of the mobile terminal is first switched to the dimmed state after the first preset time; and if the mobile terminal still does not detect an operation of the user within a second preset time, the screen of the mobile terminal is switched from the dimmed state to the off state after the second preset time; or if the mobile terminal detects an operation of the user within a second preset time, the screen of the mobile terminal is switched from the dimmed state to the on state.

2. A visual center in the embodiments of the present invention is described.

The visual center is a center of a view of the user on a plane, namely, a location on which the user fixes his or her eyes on the plane.

Generally, when the user needs to use the mobile terminal, the user needs to turn on the screen of the mobile terminal, and when the user stops using the mobile terminal, the user needs to turn off the screen of the mobile terminal. Currently, it is determined whether a location of the mobile terminal changes, to determine whether the user needs to use or stop using the mobile terminal, so as to control the screen of the mobile terminal to be turned on or turned off. However, in actual application, when the location of the mobile terminal changes, it does not necessarily mean that the user needs to use or stop using the mobile terminal. As a result, according to the method, accuracy of controlling the screen of the mobile terminal to be turned on or turned off is relatively low.

To resolve the foregoing problem, the embodiments of the present invention provide a method for controlling a screen of a mobile terminal. In the method, it may be determined, based on a motion parameter of a mobile terminal (for example, a moving height and a moving speed of the mobile terminal, and an angle between a plane of a screen of the mobile terminal and a plane of the eyes of the user), whether the mobile terminal is picked up or put down by the user, and it may be further determined, by using a sight line parameter (for example, a parameter used to determine a visual center of the user), whether the visual center of the user is on the screen, so as to accurately determine whether the user needs to use the mobile terminal or stop using the mobile terminal, and further accurately control the screen of the mobile terminal to be in an on state or an off state, so that accuracy of controlling the screen of the mobile terminal to be turned on or turned off can be improved.

The mobile terminal in the embodiments of the present invention may be an intelligent mobile terminal. The intelligent mobile terminal is a mobile terminal having an operating system. The intelligent mobile terminal may be a terminal device such as a smartphone, a tablet computer, a notebook computer, an ultra-mobile personal computer (ultra-mobile personal computer, UMPC), a netbook, a personal digital assistant (personal digital assistant, PDA), a smartwatch, or a smart band, or the intelligent mobile terminal may be an intelligent mobile terminal of another type. This is not specifically limited in the embodiments of the present invention.

The intelligent mobile terminal has an independent operating system. For example, the intelligent mobile terminal may have an Android operating system, an iOS operating system, or another operating system. This is not specifically limited in the present invention.

The following describes a system architecture of the Android operating system by using the Android operating system as an example. FIG. 1 is a schematic diagram of a possible system architecture of the Android operating system. Specifically, in FIG. 1, the system architecture of the Android operating system includes four layers, namely, a kernel layer (which may be specifically a Linux kernel layer), a library and Android operating system runtime layer, an application framework layer, and an application layer.

The kernel layer is an operating system layer of the Android operating system, is a bottom layer of Android operating system software layers, and provides a core system service based on a Linux kernel. In addition to the core system service, the kernel layer further provides a driver related to hardware of the intelligent mobile terminal, for example, a camera driver, a Bluetooth driver, a USB driver, a keyboard driver, and a Wi-Fi driver.

The library and Android operating system runtime layer is implemented by using the C language and the C++ language, and is a middle layer of the Android operating system software layers. The library and Android operating system runtime layer includes two parts. One part is a library (also referred to as a system library), and mainly includes an interface manager, a media framework, data storage, a 3D engine, a bitmap and vector, a browser engine, a 2D graphics engine, an intermediate protocol, and a Libc function library (a function library of the C language). The other part is an Android operating system runtime, and includes an Android runtime (Android runtime, ART) virtual machine and a kernel library. The ART virtual machine is configured to run an application in the Android operating system based on the kernel library, and each application in the Android operating system has one ART virtual machine that serves the application.

The application framework layer is actually a framework of an application, and a developer may develop another application when conforming to an application framework developing rule. Some important assemblies of the application framework layer include an activity manager, a window manager, a memory provider, a view system, a notification manager, a package manager, a phone manager, a resource manager, local management, and an Extensible Messaging and Presence Protocol (Extensible Messaging and Presence Protocol, XMPP) service.

The application layer is a set of applications in the Android operating system. The Android operating system itself provides many system applications such as the home screen, the contacts, the phone, and the browser. In addition, an application developer may further develop another application by using the application framework layer, for example, may install and run a third-party application on the intelligent mobile terminal.

The Android operating system is used as an example. In the embodiments of the present invention, a program used to implement the method for controlling a screen of a mobile terminal in the embodiments of the present invention may be developed based on the system architecture of the Android operating system in FIG. 1.

Figure 2:
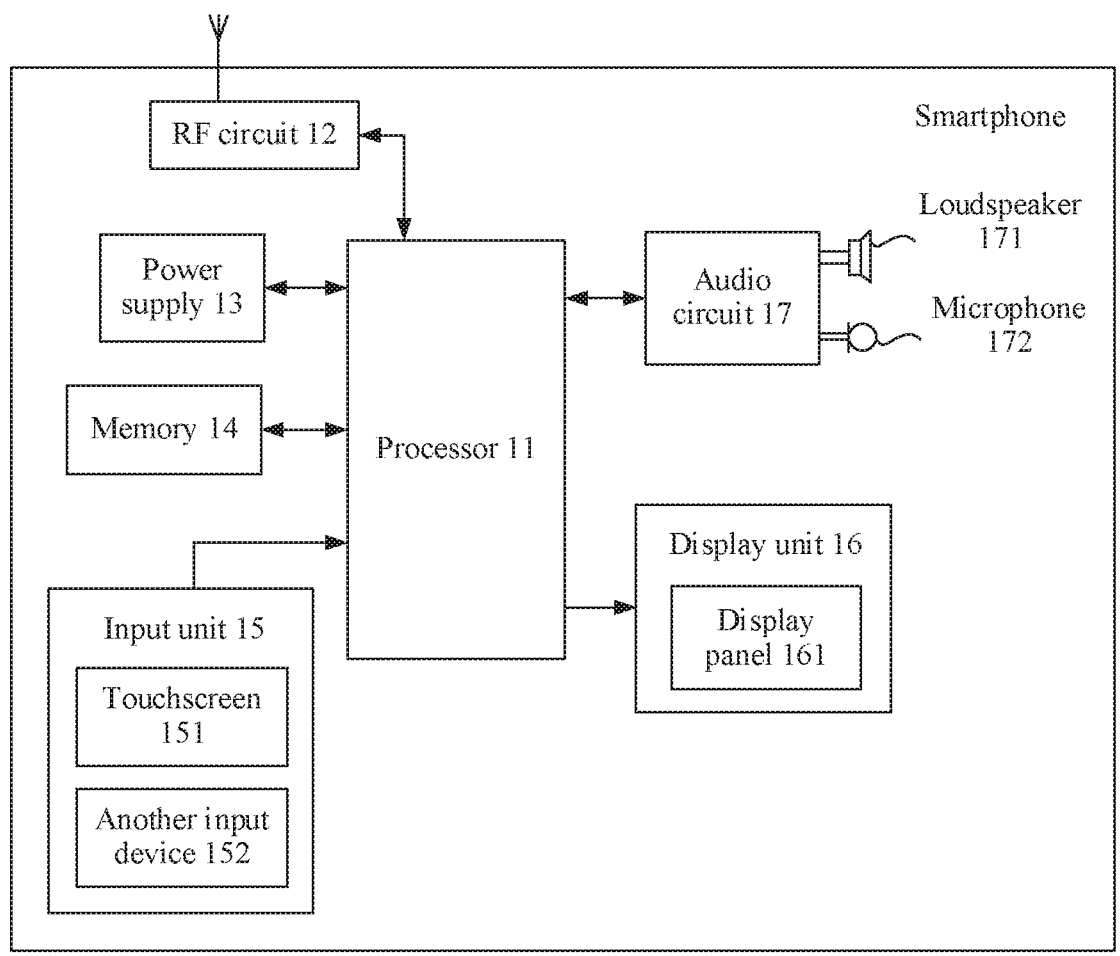
FIG. 2 is a schematic diagram of a hardware structure of a smartphone according to an embodiment of the present invention.

The following specifically describes, with reference to FIG. 2 and when the mobile terminal in the embodiments of the present invention is a smartphone, constitution components of the smartphone.

As shown in FIG. 2, the smartphone includes components such as a processor 11, a radio frequency (radio frequency, RF) circuit 12, a power supply 13, a memory 14, an input unit 15, a display unit 16, and an audio circuit 17. A person skilled in the art may understand that a structure of the smartphone in FIG. 2 does not constitute a limitation on the smartphone, and may include more or fewer components than those shown in FIG. 2, or some components in the components shown in FIG. 2 may be combined, or a component arrangement may be different from that shown in FIG. 2.

The processor 11 is a control center of the smartphone, connects all parts of the smartphone by using various interfaces and lines, and performs various functions of the smartphone and processes data by running or executing a software program and/or a module that are/is stored in the memory 14 and invoking data stored in the memory 14, so as to monitor the entire smartphone. Optionally, the processor 11 may include one or more processing units. Preferably, the processor 11 may integrate an application processor and a modem processor. The application processor mainly processes an operating system, a user interface, an application, and the like. The modem processor mainly processes radio communication. It may be understood that the modem processor may not be integrated into the processor 11.

The RF circuit 12 may be configured to receive and send signals in an information receiving and sending process or a call process. Particularly, the RF circuit receives downlink information from a base station, then sends the downlink information to the processor 11 for processing, and sends uplink data to the base station. Generally, the RF circuit includes but is not limited to: an antenna, at least one amplifier, a transceiver, a coupler, a low noise amplifier (low noise amplifier, LNA), and a duplexer. In addition, the RF circuit 12 may further communicate with a network and another device through wireless communication. The wireless communication may use any communication standard or protocol, including but not limited to: Global System for Mobile Communications (Global System for Mobile Communications, GSM), general packet radio service (General Packet Radio Service, GPRS), code division multiple access (Code Division Multiple Access, CDMA), Wideband Code Division Multiple Access (Wideband Code Division Multiple Access, WCDMA), Long Term Evolution (Long Term Evolution, LTE), e-mail, and short messaging service (Short Messaging Service, SMS).

The smartphone includes a power supply 13 (for example, a battery) for supplying power to the components. Preferably, the power supply may connect to the processor 11 logically by using a power management system, to implement functions such as charging management, discharging management, and power consumption management by using the power management system.

The memory 14 may be configured to store a software program and a module, and the processor 11 runs the software program and the module that are stored in the memory 14, to perform various function applications of the smartphone and data processing. The memory 14 may mainly include a program storage area and a data storage area. The program storage area may store an operating system, an application required by at least one function (such as a sound playback function and an image play function), and the like. The data storage area may store data (such as audio data, image data, and an address book) created based on use of the smartphone. In addition, the memory 14 may include a high-speed random access memory, or may include a non-volatile memory, for example, at least one magnetic disk storage component, a flash memory, or another volatile solid-state storage component.

The input unit 15 may be configured to: receive input digit or character information, and generate key signal input related to user setting and function control of the smartphone. Specifically, the input unit 15 may include a touchscreen 151 and another input device 152. The touchscreen 151, also referred to as a touch panel, may obtain a touch operation (such as an operation of a user on or near the touchscreen 151 by using any suitable object or accessory such as a finger or a stylus) of the user on or near the touchscreen, and drive a corresponding connection apparatus according to a preset program. Optionally, the touchscreen 151 may include a touch detection apparatus and a touch controller. The touch detection apparatus detects a touch position of the user, detects a signal generated by the touch operation, and sends the signal to the touch controller. The touch controller receives touch information from the touch detection apparatus, converts the touch information into touch point coordinates, and sends the touch point coordinates to the processor 11. Moreover, the touch controller can receive a command from the processor 11, and execute the command. In addition, the touchscreen 151 may be a resistive touchscreen, a capacitive touchscreen, an infrared touchscreen, a surface wave sound touchscreen, or the like. In addition to the touchscreen 151, the input unit 15 may further include another input device 152. Specifically, the another input device 152 may include but is not limited to one or more of a physical keyboard, a function key (such as a volume control key or a power key), a track ball, a mouse, or a joystick.

The display unit 16 may be configured to display information entered by the user or information provided for the user, and various menus of the smartphone. The display unit 16 may include a display panel 161. Optionally, the display panel 161 may be configured by using a liquid crystal display (liquid crystal display, LCD), an organic light-emitting diode (organic light-emitting diode, OLED), or the like. Further, the touchscreen 151 may cover the display panel 161. After detecting a touch operation on or near the touchscreen 151, the touchscreen 151 sends the touch operation to the processor 11, to determine a type of a touch event. Then, the processor 11 provides a corresponding visual output on the display panel 161 based on the type of the touch event. Although in FIG. 2, the touchscreen 151 and the display panel 161 are used as two independent components to implement input and output functions of the smartphone, in some embodiments, the touchscreen 151 and the display panel 161 may be integrated to implement the input and output functions of the smartphone.

The audio circuit 17, a loudspeaker 171, and a microphone 172 are configured to provide an audio interface between the user and the smartphone. The audio circuit 17 may convert received audio data into an electrical signal, and transmit the electrical signal to the loudspeaker 171. The loudspeaker 171 converts the electrical signal into a sound signal and outputs the sound signal. In another aspect, the microphone 172 converts an obtained sound signal into an electrical signal, and the audio circuit 17 receives the electrical signal and converts the electrical signal into audio data, and outputs the audio data to the RF circuit 12, so that the RF circuit 12 sends the audio data to another mobile phone, or transmits the audio data to the memory 14 for further processing.

The smartphone may further include sensors such as a gyroscope sensor, a hydrometer sensor, an infrared sensor, and a magnetometer sensor, and details are not described herein.

Although not shown, the smartphone may further include a wireless fidelity (wireless fidelity, Wi-Fi) module, a Bluetooth module, and the like. Details are not described herein.

To better understand the method for controlling a screen of a mobile terminal in the embodiments of the present invention, the method is described in the following method embodiments by way of example by using a mobile terminal as an execution body. In actual application, the method for controlling a screen of a mobile terminal in the embodiments of the present invention may be alternatively performed by a logical functional unit and/or module that can implement the method in the mobile terminal.

Figure 3:
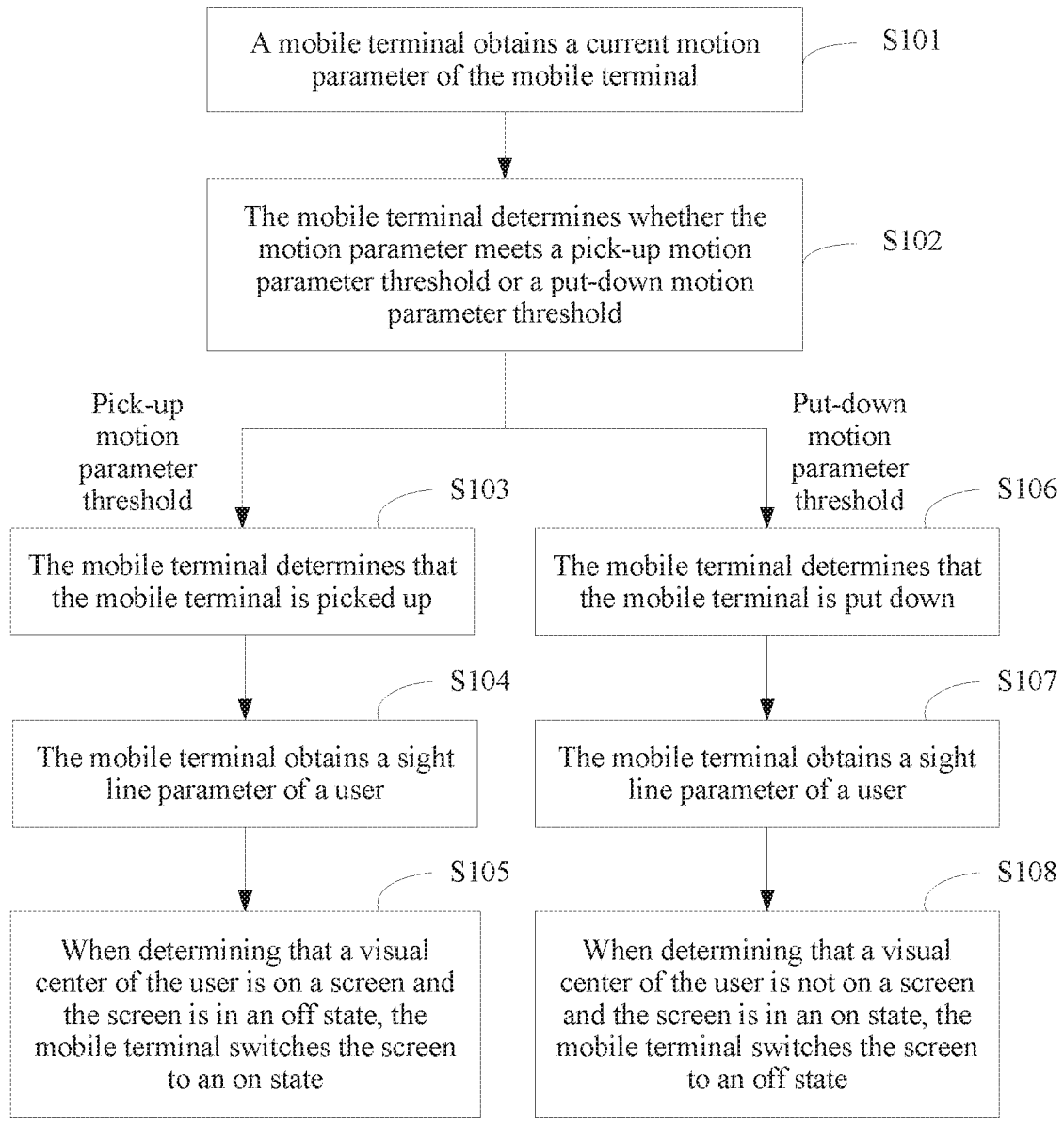
FIG. 3 is a first schematic diagram of a method for controlling a screen of a mobile terminal according to an embodiment of the present invention.

An embodiment of the present invention provides a method for controlling a screen of a mobile terminal. As shown in FIG. 3, the method may include the following steps.

S101. A mobile terminal obtains a current motion parameter of the mobile terminal.

The motion parameter may be used to determine whether the mobile terminal is picked up or put down.

S102. The mobile terminal determines whether the motion parameter meets a pick-up parameter threshold or a put-down parameter threshold.

Further, in this embodiment of the present invention, when the motion parameter meets the pick-up parameter threshold, the mobile terminal may perform steps S103 to S105, or when the motion parameter meets the put-down parameter threshold, the mobile terminal may perform steps S106 to S108.

It should be noted that in this embodiment of the present invention, in addition to the case in which the motion parameter meets the pick-up parameter threshold and the case in which the motion parameter meets the put-down parameter threshold, a case in which the motion parameter meets neither the pick-up parameter threshold nor the put-down parameter threshold may be further included. When the motion parameter meets neither the pick-up parameter threshold nor the put-down parameter threshold, the mobile terminal may continue to perform S101.

Optionally, in this embodiment of the present invention, the motion parameter may include at least one of an angle, a moving speed of the mobile terminal (which may be specifically a speed of the mobile terminal moved by the user), or a moving height of the mobile terminal (which may be specifically a height of the mobile terminal moved by the user). The angle may be an angle between a plane of a screen and a plane of the eyes of the user.

Correspondingly, the pick-up parameter threshold may include at least one of a first angle range, a first moving speed threshold, or a first moving height threshold. The put-down parameter threshold may include at least one of a second angle range, a second moving speed threshold, or a second moving height threshold.

With reference to the motion parameter, the pick-up parameter threshold, and the put-down parameter threshold that are described above, in this embodiment of the present invention, that the motion parameter meets the pick-up parameter threshold may include at least one of the following: The angle falls within the first angle range; the moving speed is greater than or equal to the first moving speed threshold; or the moving height is greater than or equal to the first moving height threshold. That the motion parameter meets the put-down parameter threshold may include at least one of the following: The angle falls within the second angle range; the moving speed is greater than or equal to the second moving speed threshold; or the moving height is greater than or equal to the second moving height threshold.

S103. The mobile terminal determines that the mobile terminal is picked up.

In this embodiment of the present invention, after determining that the mobile terminal is picked up, the mobile terminal may perform step S104.

S104. The mobile terminal obtains a sight line parameter of a user.

The sight line parameter of the user is used to determine whether a visual center of the user is on the screen of the mobile terminal.

Optionally, in this embodiment of the present invention, the sight line parameter of the user may be obtained by using either of the following two methods.

In one method, a facial image of the user is collected by using a camera embedded into the mobile terminal, and the facial image of the user is analyzed, to obtain the sight line parameter of the user, so as to determine whether the visual center of the user is on the screen of the mobile terminal.

In the other method, eye tracking is performed on the user by using a camera or an eye tracking unit embedded into the mobile terminal, to obtain the sight line parameter of the user, so as to determine whether the visual center of the user is on the screen of the mobile terminal.

S105. When determining that a visual center of the user is on a screen and the screen is in an off state, the mobile terminal switches the screen to an on state.

In this embodiment of the present invention, the mobile terminal may switch the screen of the mobile terminal to the on state, that is, control the screen of the mobile terminal to be turned on, when determining that the mobile terminal is picked up and that the visual center of the user is on the screen of the mobile terminal, and a current status of the screen of the mobile terminal is the off state.

It should be noted that the mobile terminal may keep a status of the screen of the mobile terminal unchanged when determining that the mobile terminal is picked up and that the visual center of the user is on the screen of the mobile terminal, and the current status of the screen of the mobile terminal is the on state.

Optionally, in this embodiment of the present invention, the status of the screen of the mobile terminal may be obtained by the mobile terminal through determining. Specifically, the mobile terminal may determine the status of the screen of the mobile terminal in real time, or may determine the status of the screen of the mobile terminal at a particular time before the status of the screen of the mobile terminal is switched, and this is not limited in the present invention.

S106. The mobile terminal determines that the mobile terminal is put down.

In this embodiment of the present invention, after determining that the mobile terminal is put down, the mobile terminal may perform step S107.

S107. The mobile terminal obtains a sight line parameter of a user.

For specific descriptions of S107, refer to the related descriptions of S104, and details are not described herein again.

S108. When determining that a visual center of the user is not on a screen and the screen is in an on state, the mobile terminal switches the screen to an off state.

In this embodiment of the present invention, the mobile terminal may switch the status of the screen of the mobile terminal to the off state, that is, control the screen of the mobile terminal to be turned off, when determining that the mobile terminal is put down and that the visual center of the user is not on the screen of the mobile terminal, and the current status of the screen of the mobile terminal is the on state.

It should be noted that the mobile terminal may keep the status of the screen of the mobile terminal unchanged when determining that the mobile terminal is put down and that the visual center of the user is not on the screen of the mobile terminal, and the current status of the screen of the mobile terminal is the off state.

In the method for controlling a screen of a mobile terminal in this embodiment of the present invention, the mobile terminal obtains the current motion parameter of the mobile terminal, determines whether the motion parameter meets the pick-up parameter threshold or the put-down parameter threshold, determines, when the motion parameter meets the pick-up parameter threshold, that the mobile terminal is picked up, obtains the sight line parameter of the user, and switches the screen to the on state when determining that the visual center of the user is on the screen of the mobile terminal and the screen is in the off state. When the motion parameter meets the put-down parameter threshold, the mobile terminal determines that the mobile terminal is put down, obtains the sight line parameter of the user, and switches the screen to the off state when determining that the visual center of the user is not on the screen and the screen is in the on state. In other words, in this embodiment of the present invention, it may be determined, based on a motion status parameter of the mobile terminal, whether the mobile terminal is picked up or put down by the user, and it may be further determined, by using the sight line parameter, whether the visual center of the user is on the screen, so that it may be accurately determined whether the user needs to use the mobile terminal or stop using the mobile terminal, to accurately control the screen of the mobile terminal to be in the on state or the off state. Therefore, accuracy of controlling the screen of the mobile terminal to be turned on or turned off can be improved.

In actual application, the method for controlling a screen of a mobile terminal in the embodiments of the present invention may be applied to two scenarios (namely, a first scenario and a second scenario). In the first scenario, when a user needs to use a mobile terminal, the user needs to turn on a screen of the mobile terminal, and in the second scenario, when the user stops using the mobile terminal, the user may turn off the screen of the mobile terminal. To better understand the technical solutions of the embodiments of the present invention, the following separately describes, by using the foregoing two scenarios as examples, the method for controlling a screen of a mobile terminal in the embodiments of the present invention.

In the first scenario, when the user needs to use the mobile terminal, the user needs to turn on the screen of the mobile terminal.

Figure 4A:
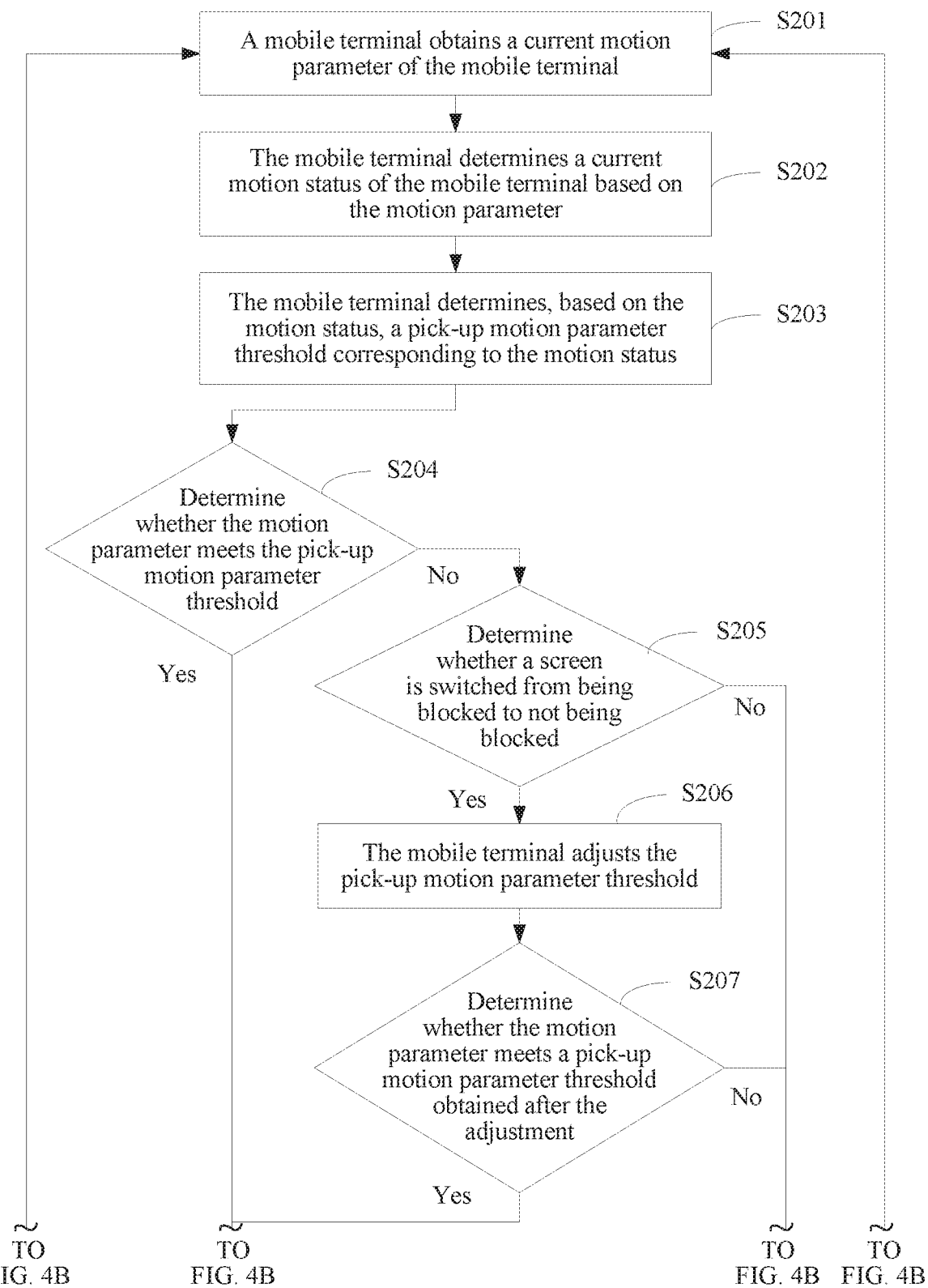
FIG. 4A and FIG. 4B are a second schematic diagram of a method for controlling a screen of a mobile terminal according to an embodiment of the present invention.
Figure 4B:
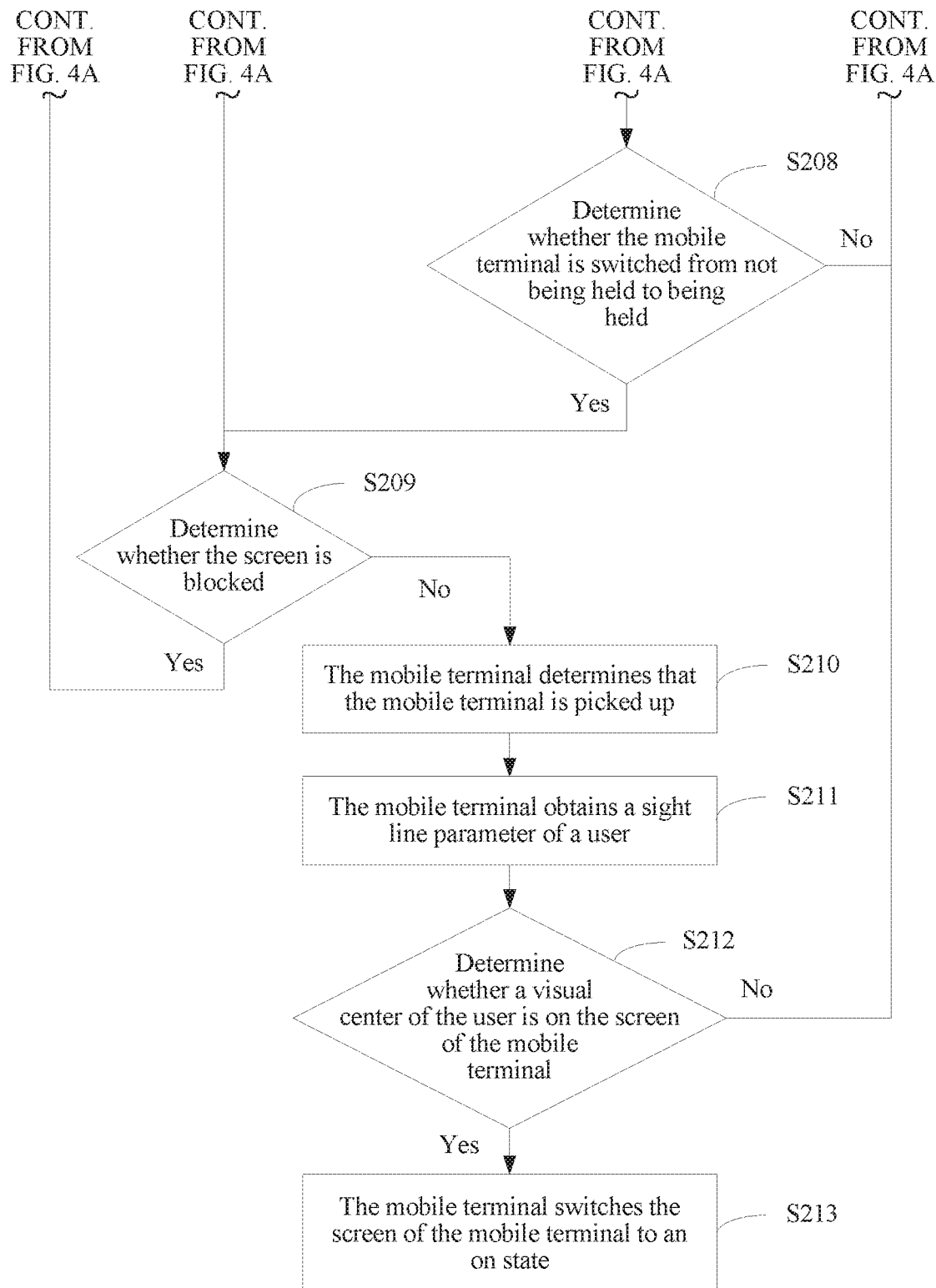

An embodiment of the present invention provides a method for controlling a screen of a mobile terminal. As shown in FIG. 4A and FIG. 4B, the method may include the following steps.

S201. A mobile terminal obtains a current motion parameter of the mobile terminal.

For specific descriptions of S201, refer to the related descriptions of S101, and details are not described herein again.

S202. The mobile terminal determines a current motion status of the mobile terminal based on the motion parameter.

Optionally, the motion status may include a first motion state in which a moving speed of the mobile terminal is A, a second motion state in Which the moving speed of the mobile terminal is B, and a third motion state in which the moving speed of the mobile terminal is C, where A<B<C.

For example, assuming that the moving speed of the mobile terminal (namely, a speed of picking up, by a user, the mobile terminal) is A when the user picks up the mobile terminal when staying still, it may be considered that the mobile terminal is in the first motion state in this case. Assuming that the moving speed of the mobile terminal is B when the user picks up the mobile terminal when walking, it may be considered that the mobile terminal is in the second motion state in this case. Assuming that the moving speed of the mobile terminal is C when the user picks up the mobile terminal when running, it may be considered that the mobile terminal is in the third motion state in this case. In this embodiment of the present invention, because different moving speeds (namely, the speeds of picking up, by the user, the mobile terminal) of the mobile terminal correspond to different motion states of the mobile terminal, the mobile terminal may determine, based on a current moving speed of the mobile terminal, a motion state corresponding to the moving speed.

Further, because the mobile terminal may determine, based on the motion parameter, a pick-up parameter threshold and a put-down parameter threshold that correspond to the motion status of the mobile terminal, the pick-up parameter threshold and the put-down parameter threshold can be determined more accurately, so as to more accurately determine whether the mobile terminal is picked up or put down.

S203. The mobile terminal determines, based on the motion status, a pick-up parameter threshold corresponding to the motion status.

In this embodiment of the present invention, when the mobile terminal in different motion states, pick-up parameter thresholds are different. Therefore, the mobile terminal may determine the corresponding pick-up parameter threshold based on the motion status of the mobile terminal.

A correspondence between the motion status of the mobile terminal and the pick-up parameter threshold may be pre-stored in the mobile terminal. The pick-up parameter thresholds may be obtained after statistical analysis is performed on a plurality of pieces of experiment data. For example, cases in which the mobile terminal is in different motion states may be simulated, motion parameters obtained when the user picks up the mobile terminal in the different motion states are separately determined, and statistical analysis is performed on data of motion parameters obtained after a plurality of experiments, to finally determine pick-up parameter thresholds corresponding to the different motion states of the mobile terminal. For example, the data of the motion parameters obtained after the plurality of experiments may be classified based on the different motion states, an average value (which may be an arithmetic average value, a geometric average value, or the like) of each category of motion parameters is calculated, and then the average value is used as the pick-up parameter threshold in the corresponding motion state.

Optionally, Table 1 shows examples of the correspondence between the motion status of the mobile terminal and the pick-up parameter threshold in this embodiment of the present invention.

TABLE 1

| Motion status of the mobile terminal | Pick-up parameter threshold |
| --- | --- |
| First motion state | Pick-up parameter threshold 1 |
| Second motion state | Pick-up parameter threshold 2 |
| Third motion state | Pick-up parameter threshold 3 |

As shown in Table 1, the first motion state corresponds to the pick-up parameter threshold 1, the second motion state corresponds to the pick-up parameter threshold 2, and the third motion state corresponds to the pick-up parameter threshold 3. In this embodiment of the present invention, the pick-up parameter threshold 1, the pick-up parameter threshold 2, and the pick-up parameter threshold 3 are different.

S204. The mobile terminal determines whether the motion parameter meets the pick-up parameter threshold.

If the motion parameter does not meet the pick-up parameter threshold, step S205 is performed, or if the motion parameter meets the pick-up parameter threshold, step S209 is performed.

For specific descriptions of S204, refer to the related descriptions of S102, and details are not described herein again.

S205. The mobile terminal determines Whether a screen of the mobile terminal is switched from being blocked to not being blocked.

If the mobile terminal determines that the screen of the mobile terminal is switched from being blocked to not being blocked, step S206 and step S207 are performed, or if the mobile terminal determines that the screen of the mobile terminal is not switched from being blocked to not being blocked, step S208 is performed.

S206. The mobile terminal adjusts the pick-up parameter threshold.

If the mobile terminal determines that the screen of the mobile terminal is switched from being blocked to not being blocked, it indicates that the user probably needs to use the mobile terminal. However, the current motion parameter of the mobile terminal does not meet the current pick-up parameter threshold. In this case, to further improve accuracy of controlling the screen to be turned on, the current pick-up parameter threshold can be adjusted appropriately. For example, a first angle range in the current pick-up parameter threshold is increased, and/or a first moving speed threshold in the current pick-up parameter threshold is decreased, and/or a first moving height threshold in the current pick-up parameter threshold is decreased.

S207. The mobile terminal determines whether the motion parameter meets a pick-up parameter threshold obtained after the adjustment.

If the motion parameter does not meet the pick-up parameter threshold obtained after the adjustment, step S208 is performed, or if the motion parameter meets the pick-up parameter threshold obtained after the adjustment, step S209 is performed.

S208. The mobile terminal determines whether the mobile terminal is switched from not being held to being held.

If the mobile terminal determines that the mobile terminal is switched from not being held to being held, step S209 is performed, or if the mobile terminal determines that the mobile terminal is not switched from not being held to being held, step S201 is performed.

When the motion parameter of the mobile terminal does not meet the pick-up parameter threshold obtained after the adjustment, or the screen of the mobile terminal is not switched from being blocked to not being blocked, to further improve accuracy of controlling the screen to be turned on, the mobile terminal may further determine whether the mobile terminal is switched from not being held to being held, to determine whether the user needs to use the mobile terminal. If the mobile terminal determines that the mobile terminal is switched from not being held to being held, it indicates that the user probably needs to use the mobile terminal, and step S209 is performed, or if the mobile terminal determines that the mobile terminal is not switched from not being held to being held, it indicates that the user probably does not need to use the mobile terminal, and step S201 is performed.

Specifically, a method for determining, by the mobile terminal, that the mobile terminal is switched from not being held to being held may include the following steps.

S208a. The mobile terminal obtains at least two sensing parameter values.

The at least two sensing parameter values are used to determine whether the mobile terminal is held. The at least two sensing parameter values may be obtained by using at least two sensing units disposed in the mobile terminal. The at least two sensing units may be disposed on two sides of a rear face of the mobile terminal. Specifically, the at least two sensing units owe described in detail in the following embodiment.

S208b. The mobile terminal calculates an eigenvalue of the at least two sensing parameter values based on the at least two sensing parameter values.

It should be noted that the eigenvalue may be a standard deviation or a variance, or may be another eigenvalue that may be used to determine whether the mobile terminal is held. Specifically, a type of the eigenvalue may be determined based on an actual case, and this is not limited in this embodiment of the present invention.

S208c. When the eigenvalue is greater than or equal to a holding decision threshold, and the eigenvalue obtained after previous calculation is less than the holding decision threshold, determine that the mobile terminal is switched from not being held to being held.

Optionally, the mobile terminal may obtain the foregoing at least two sensing parameter values in real time, calculate the eigenvalue of the at least two sensing parameter values in real time, and determine a relationship between the eigenvalue and the holding decision threshold in real time.

It should be noted that when the eigenvalue is greater than or equal to the holding decision threshold, it may be determined that the mobile terminal is held, or when the eigenvalue is less than the holding decision threshold, it may be determined that the mobile terminal is not held. Therefore, it may be determined whether the eigenvalue is greater than or equal to the holding decision threshold, to determine whether the mobile terminal is held, so that when the eigenvalue is greater than or equal to the holding decision threshold, and the eigenvalue obtained after previous calculation is less than the holding decision threshold (that is, a relationship between the eigenvalue obtained after current calculation and the holding decision threshold is different from a relationship between the eigenvalue obtained after previous calculation and the holding decision threshold, for example, the eigenvalue obtained after previous calculation is less than the holding decision threshold, and the eigenvalue obtained after current calculation is greater than or equal to the holding decision threshold), it is determined that the mobile terminal is switched from not being held to being held.

Figure 5:
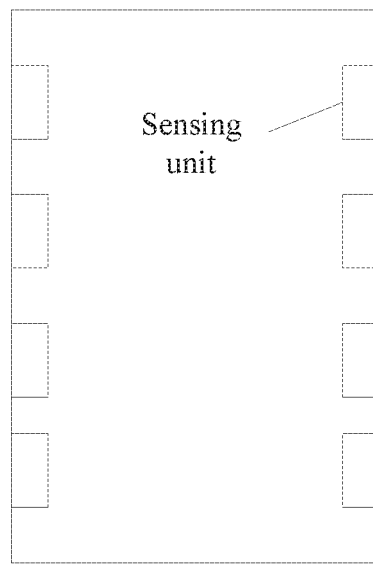
FIG. 5 is a schematic diagram of at least sensing units according to an embodiment of the present invention.

For hardware implementation of the method for determining whether the mobile terminal is held, as shown in FIG. 5, a plurality of sensing units may be separately disposed at intervals on the two sides of the rear face of the mobile terminal (when two sensing units are disposed in the mobile terminal, one sensing unit may be disposed on each of the two sides of the rear face of the mobile terminal). The sensing unit in this embodiment of the present invention may be specifically implemented by using a capacitive sensor.

It should be noted that a specific quantity of sensing units disposed in the mobile terminal in this embodiment of the present invention may be set based on a size of the mobile terminal and a requirement for accuracy of determining whether the mobile terminal is held. For example, when more sensing units are disposed in the mobile terminal, accuracy of determining whether the mobile terminal is held is higher. However, because a sensing unit needs to be integrated into the mobile terminal, a limitation caused by the size of the mobile terminal on the quantity of sensing units needs to be considered.

The following describes the method for determining whether the mobile terminal is held in this embodiment of the present invention by using an example in which four capacitive sensors are disposed on each of the two sides of the rear face of the mobile terminal, that is, eight capacitive sensors are disposed in total.

In an actual application scenario, when the user holds the mobile terminal by using a hand, contact between the hand and the mobile terminal usually is uneven. Therefore, eight capacitances detected by the eight capacitive sensors differ relatively greatly, and an eigenvalue obtained through calculation based on the eight capacitances is relatively large. When a non-hand substance touches the mobile terminal, contact between the substance and the mobile terminal usually is even. Therefore, eight capacitances detected by the eight capacitive holding sensors differ relatively slightly, and an eigenvalue obtained through calculation based on the eight capacitances is relatively small. Therefore, in this embodiment of the present invention, the capacitances detected by the eight capacitive sensors may be obtained to calculate the eigenvalue, and then it is learned, by determining whether the eigenvalue is greater than or equal to the preset holding decision threshold, whether the mobile terminal is held.

In this embodiment of the present invention, holding mainly means that the mobile terminal is held by the hand of the user.

Figure 6:
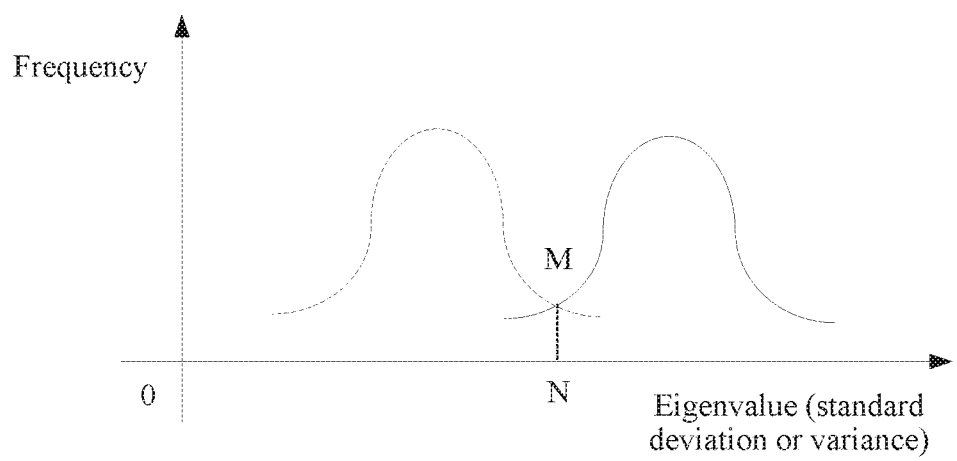
FIG. 6 is a schematic diagram of a holding decision threshold according to an embodiment of the present invention.

The preset holding decision threshold may be obtained after statistical analysis is performed on a plurality of pieces of experiment data. For example, a case in which a non-hand substance touches the mobile terminal may be simulated, and a plurality of experiment measurements and calculations are performed to obtain a plurality of groups of eigenvalues. A case in which the mobile terminal is held by the hand of the user is simulated, and a plurality of experiment measurements and calculations are performed to obtain a plurality of groups of eigenvalues. Then, normal distribution fitting is performed on the plurality of groups of eigenvalues obtained in the two cases, to determine an eigenvalue corresponding to an intersection point of normal distribution images in the two cases, and use the eigenvalue as the holding decision threshold. For example, as shown in FIG. 6, a dashed line shows a normal distribution diagram of the plurality of groups of eigenvalues obtained when the case in which the non-hand substance touches the mobile terminal is simulated, a solid line shows a normal distribution diagram of the plurality of groups of eigenvalues obtained when the case in which the mobile terminal is held by the hand of the user is simulated, and an eigenvalue (represented as N in FIG. 6) corresponding to an intersection point (represented as M in FIG. 6) of the two normal distribution diagrams is the holding decision threshold.

S209. The mobile terminal determines whether the screen of the mobile terminal is blocked.

If the mobile terminal determines that the screen of the mobile terminal is not blocked, steps S210 to S212 are performed, or if the mobile terminal determines that the screen of the mobile terminal is blocked, step S201 is performed.

When the motion parameter meets the pick-up parameter threshold, to further improve accuracy of determining that the mobile terminal is picked up, it may be further determined whether the screen of the mobile terminal is blocked. If the screen of the mobile terminal is not blocked, it indicates that the user probably needs to use the mobile terminal, and it is determined that the mobile terminal is picked up, or if the screen of the mobile terminal is blocked, it indicates that the user probably does not need to use the mobile terminal, step S201 is performed.

S210. The mobile terminal determines that the mobile terminal is picked up.

S211. The mobile terminal obtains a sight line parameter of a user.

For specific descriptions of S211, refer to the related descriptions of S104, and details are not described herein again.

S212. The mobile terminal determines whether a visual center of the user is on the screen of the mobile terminal.

If it is determined that the visual center of the user is on the screen of the mobile terminal and the screen of the mobile terminal is in an off state, step S213 is performed, or if it is determined that the visual center of the user is not on the screen of the mobile terminal, step S201 is performed.

S213. The mobile terminal switches the screen of the mobile terminal to an on state.

In the method for controlling a screen of a mobile terminal in this embodiment of the present invention, the mobile terminal obtains the current motion parameter of the mobile terminal, determines whether the motion parameter meets the pick-up parameter threshold, determines, when the motion parameter meets the pick-up parameter threshold, that the mobile terminal is picked up, obtains the sight line parameter of the user, and switches the screen to the on state when determining that the visual center of the user is on the screen of the mobile terminal and the screen is in the off state. In other words, in this embodiment of the present invention, it may be determined, based on the motion parameter of the mobile terminal, whether the mobile terminal is picked up by the user, and it may be further determined, by using the sight line parameter, whether the visual center of the user is on the screen, so that it may be accurately determined whether the user needs to use the mobile terminal, to accurately control the screen of the mobile terminal to be in the on state. Therefore, accuracy of controlling the screen of the mobile terminal to be turned on can be improved.

In the second scenario, when the user stops using the mobile terminal, the user may turn off the screen of the mobile terminal.

Figure 7A:
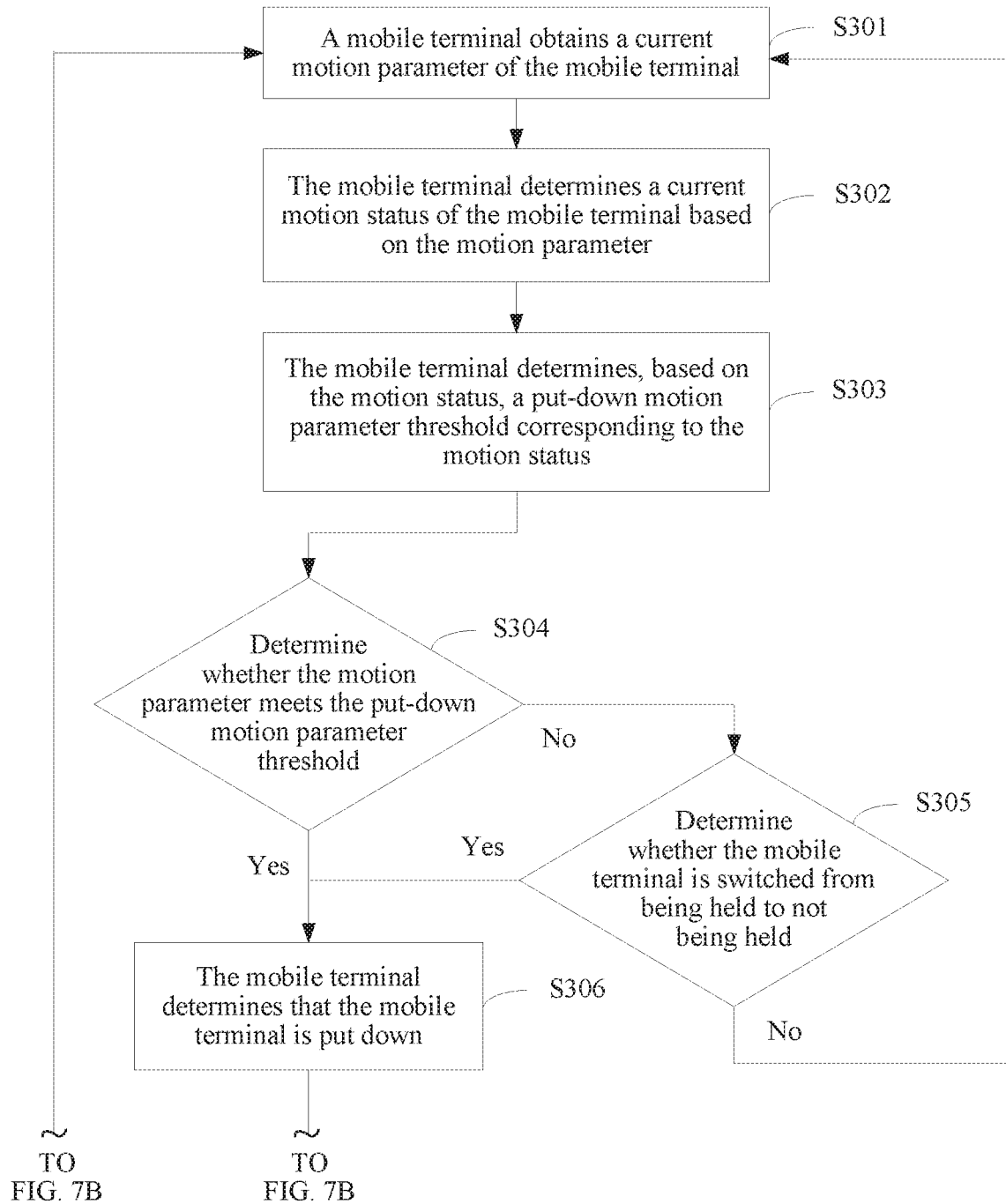
FIG. 7A and FIG. 7B are a third schematic diagram of a method for controlling a screen of a mobile terminal according to an embodiment of the present invention.
Figure 7B:
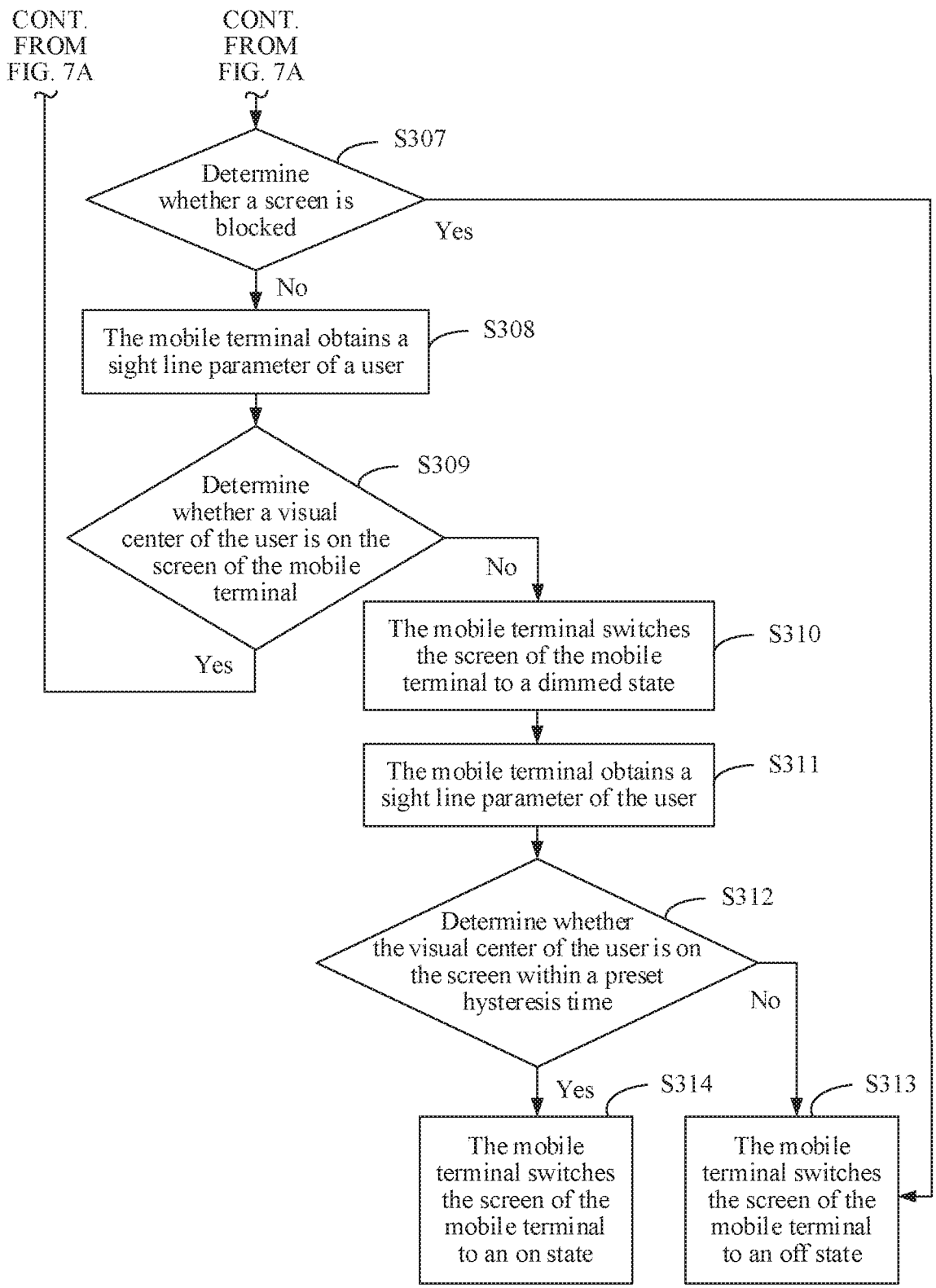

An embodiment of the present invention provides a method for controlling a screen of a mobile terminal. As shown in FIG. 7A and FIG. 7B, the method includes the following steps.

S301. A mobile terminal obtains a current motion parameter of the mobile terminal.

For specific descriptions of S301, refer to the related descriptions of S101, and details are not described herein again.

S302. The mobile terminal determines a current motion status of the mobile terminal based on the motion parameter.

Optionally, the motion status may include a first motion state in which a moving speed of the mobile terminal is A, a second motion state in which the moving speed of the mobile terminal is B, and a third motion state in which the moving speed of the mobile terminal is C, where A<B<C.

For example, assuming that the moving speed of the mobile terminal (namely, a speed of putting down, by a user, the mobile terminal) is A when the user puts down the mobile terminal when staying still, it may be considered that the mobile terminal is in the first motion state in this case.

Assuming that the moving speed of the mobile terminal is B when the user puts down the mobile terminal. When walking, it may be considered that the mobile terminal is in the second motion state in this case. Assuming that the moving speed of the mobile terminal is C when the user puts down the mobile terminal when running, it may be considered that the mobile terminal is in the third motion state in this case. In this embodiment of the present invention, because different moving speeds (namely, the speeds of putting down, by the user, the mobile terminal) of the mobile terminal correspond to different motion states of the mobile terminal, the mobile terminal may determine, based on a current moving speed of the mobile terminal, a motion state corresponding to the moving speed.

S303. The mobile terminal determines, based on the motion status, a put-down parameter threshold corresponding to the motion status.

In this embodiment of the present invention, when the mobile terminal is in different motion states, put-down parameter thresholds are different. Therefore, the mobile terminal may determine the corresponding put-down parameter threshold based on the motion status of the mobile terminal.

A correspondence between the motion status of the mobile terminal and the put-down parameter threshold may be pre-stored in the mobile terminal. The put-down parameter thresholds may be obtained after statistical analysis is performed on a plurality of pieces of experiment data. For example, cases in which the mobile terminal is in different motion states may be simulated, motion parameters obtained when the user puts down the mobile terminal in the different motion states are separately determined, and statistical analysis is performed on data of the motion parameters obtained after a plurality of experiments, to finally determine put-down parameter thresholds corresponding to the different motion states of the mobile terminal. For example, the data of the motion parameters obtained after the plurality of experiments may be classified based on the different motion states, an average value (which may be an arithmetic average value, a geometric average value, or the like) of each category of motion parameters is calculated, and then the average value is used as the put-down parameter threshold in the corresponding motion state.

Optionally, Table 2 shows examples of the correspondence between the motion status of the mobile terminal and the put-down parameter threshold in this embodiment of the present invention.

TABLE 2

| Motion status of the mobile terminal | Put-down parameter threshold |
| --- | --- |
| First motion state | Put-down parameter threshold 1 |
| Second motion state | Put-down parameter threshold 2 |
| Third motion state | Put-down parameter threshold 3 |

As shown in Table 2, the first motion state corresponds to the put-down parameter threshold 1, the second motion state corresponds to the put-down parameter threshold 2, and the third motion state corresponds to the put-down parameter threshold 3. In this embodiment of the present invention, the put-down parameter threshold 1, the put-down parameter threshold 2, and the put-down parameter threshold 3 are different.

S304. The mobile terminal determines whether the motion parameter meets the put-down parameter threshold.

If the motion parameter does not meet the put-down parameter threshold, step S305 is performed, or if the motion parameter meets the put-down parameter threshold, step S309 is performed.

For specific descriptions of S304, refer to the related descriptions of S102, and details are not described herein again.

S305. The mobile terminal determines whether the mobile terminal is switched from being held to not being held.

If the mobile terminal determines that the mobile terminal is switched from being held to not being held, step S306 is performed, or if the mobile terminal determines that the mobile terminal is not switched from being held to not being held, step S301 is performed.

When the motion parameter of the mobile terminal does not meet the put-down parameter threshold, to further improve accuracy of controlling a screen to be turned off, the mobile terminal may further determine whether the mobile terminal is switched from being held to not being held, to determine whether the user stops using the mobile terminal. If the mobile terminal determines that the mobile terminal is switched from being held to not being held, it indicates that the user probably stops using the mobile terminal, and step S306 is performed, or if the mobile terminal determines that the mobile terminal is not switched from being held to not being held, it indicates that the user probably does not stop using the mobile terminal, and step S301 is performed.

Specifically, a method for determining, by the mobile terminal, that the mobile terminal is switched from being held to not being held may be implemented by replacing, with S208$d$, S208$c$ in the method for determining, by the mobile terminal, that the mobile terminal is switched from not being held to being held, that is, S208$a$ to S208$c$.

S208$d$. When the eigenvalue of the at least two sensing parameter values that is obtained through calculation is less than a holding decision threshold, and the eigenvalue obtained after previous calculation is greater than or equal to the holding decision threshold, determine that the mobile terminal is switched from being held to not being held.

In this embodiment, after the mobile terminal calculates the eigenvalue of the at least two sensing parameter values according to the method of S208$a$ and S208$b$, the mobile terminal may determine, when the eigenvalue is less than the holding decision threshold and the eigenvalue obtained after previous calculation is greater than or equal to the holding decision threshold (that is, a relationship between the eigenvalue obtained after current calculation and the holding decision threshold is different from a relationship between the eigenvalue obtained after previous calculation and the holding decision threshold, for example, the eigenvalue obtained after previous calculation is greater than or equal to the holding decision threshold, and the eigenvalue obtained after current calculation is less than the holding decision threshold), that the mobile terminal is switched from being held to not being held.

For specific hardware implementation of the method for determining whether the mobile terminal is held, as shown in FIG. 5, refer to the corresponding descriptions of S208.

S306. The mobile terminal determines that the mobile terminal is put down.

S307. The mobile terminal determines whether a screen of the mobile terminal is blocked.

If the mobile terminal determines that the screen of the mobile terminal is not blocked, step S308 is performed, or if the mobile terminal determines that the screen of the mobile terminal is blocked, step S313 is performed.

In the method for controlling a screen of a mobile terminal in this embodiment of this application, after it is determined that the mobile terminal is put down, to further improve accuracy of controlling the screen to be turned off and reduce power consumption, it may be determined whether the screen of the mobile terminal is blocked, and when it is determined that the screen of the mobile terminal is blocked, it may be determined that the user does not need to use the mobile terminal, and the screen of the mobile terminal is directly switched to an off state without a need to obtain a sight line parameter of the user.

S308. The mobile terminal obtains a sight line parameter of a user.

For specific descriptions of S308, refer to the related descriptions of S104, and details are not described herein again.

S309. The mobile terminal determines whether a visual center of the user is on the screen of the mobile terminal.

If it is determined that the visual center of the user is not on the screen of the mobile terminal and the screen of the mobile terminal is in an on state, step S310 is performed, or if it is determined that the visual center of the user is on the screen of the mobile terminal, step S301 is performed.

S310. The mobile terminal switches the screen of the mobile terminal to a dimmed state.

In this embodiment of the present invention, after switching the screen of the mobile terminal to the dimmed state, the mobile terminal may perform step S311.

S311. The mobile terminal obtains a sight line parameter of the user.

For specific descriptions of S311, refer to the related descriptions of S104, and details are not described herein again.

S312. The mobile terminal determines whether the visual center of the user is on the screen of the mobile terminal within a preset hysteresis time.

If it is determined that the visual center of the user is constantly not on the screen of the mobile terminal within the preset hysteresis time, step S313 is performed after the hysteresis time, or if it is determined that the visual center of the user is back on the screen of the mobile terminal within the preset hysteresis time, step S314 is performed.

S31:3. The mobile terminal switches the screen of the mobile terminal to an off state.

S314. The mobile terminal switches the screen of the mobile terminal to an on state.

In this embodiment of the present invention, when the screen of the mobile terminal needs to be switched from the on state to the off state, to further improve accuracy of controlling the screen of the mobile terminal to be turned off, the screen of the mobile terminal first may be switched to the dimmed state, and remain in the dimmed state for the preset hysteresis time, and the sight line parameter of the user may be constantly obtained within the preset hysteresis time. If it is determined that the visual center of the user is constantly not on the screen of the mobile terminal within the preset hysteresis time, the screen of the mobile terminal is switched from the dimmed state to the off state after the preset hysteresis time, or if it is determined that the visual center of the user is back on the screen of the mobile terminal within the preset hysteresis time, the screen of the mobile terminal is switched from the dimmed state to the on state.

In the method for controlling a screen of a mobile terminal in this embodiment of the present invention, the mobile terminal obtains the current motion parameter of the mobile terminal, determines whether the motion parameter meets the put-down parameter threshold, determines, when the motion parameter meets the put-down parameter threshold, that the mobile terminal is put down, obtains the sight line parameter of the user, and switches the screen to the off state when determining that the visual center of the user is not on the screen and the screen is in the on state. In other words, in this embodiment of the present invention, it may be determined, based on a motion status parameter of the mobile terminal, whether the mobile terminal is put down by the user, and it may be further determined, by using the sight line parameter, whether the visual center of the user is on the screen, so that it may be accurately determined whether the user stops using the mobile terminal, to accurately control the screen of the mobile terminal to be in the off state. Therefore, accuracy of controlling the screen of the mobile terminal to be fumed off can be improved.

The foregoing method embodiments mainly describe the solutions of the embodiments of the present invention from the perspective of the mobile terminal. It may be understood that, to implement the foregoing functions, the mobile terminal includes a corresponding hardware structure and/or software module for performing the functions. A person of ordinary skill in the art should be easily aware that, the units and algorithm steps in the examples described with reference to the embodiments disclosed in this specification may be implemented by hardware or a combination of hardware and computer software in the present invention. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the present invention.

In the embodiments of the present invention, the mobile terminal may be divided into functional modules according to the method embodiments. For example, each functional module may be obtained through division based on a corresponding function, or two or more functions may be integrated into one processing module. The integrated module may be implemented in a form of hardware, or may be implemented in a form of a functional module of software. It should be noted that the module division in the embodiments of the present invention is an example, and is merely logical function division. There may be another division manner in an actual implementation.

Figure 8:
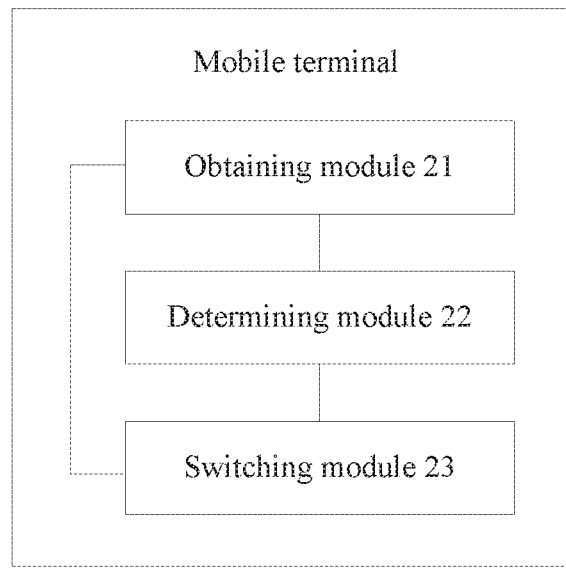
FIG. 8 is a first schematic structural diagram of a mobile terminal according to an embodiment of the present invention.

For example, when functional modules are obtained through division by using corresponding functions, a schematic structural diagram of a mobile terminal provided in an embodiment of the present invention is shown in FIG. 8. In FIG. 8, the mobile terminal includes an obtaining module 21, a determining module 22, and a switching module 23.

The obtaining module 21 is configured to support the mobile terminal in performing S101, S104, and S107 in the method process shown in FIG. 3 in the method embodiment, performing S201 and S211 in the method process shown in FIG. 4A and FIG. 4B in the method embodiment, and performing S301, S308, and S311 in the method process shown in FIG. 7A and FIG. 7B in the method embodiment.

The determining module 22 is configured to support the mobile terminal in performing S102, S103, and S106 in the method process shown in FIG. 3 in the method embodiment, performing S202, S203, S204, S205, S207, S208, S209, S210, and S212 in the method process shown in FIG. 4A and FIG. 4B in the method embodiment, and performing S302, S303, S304, S305, S306, S307, S309, and S312 in the method process shown in FIG. 7A and FIG. 7B in the method embodiment.

The switching module 23 is configured to support the mobile terminal in performing S105 and S108 in the method process shown in FIG. 3 in the method embodiment, performing S213 in the method process shown in FIG. 4B in the method embodiment, and performing S310, S313, and S314 in the method process shown in FIG. 7B in the method embodiment.

Figure 9:
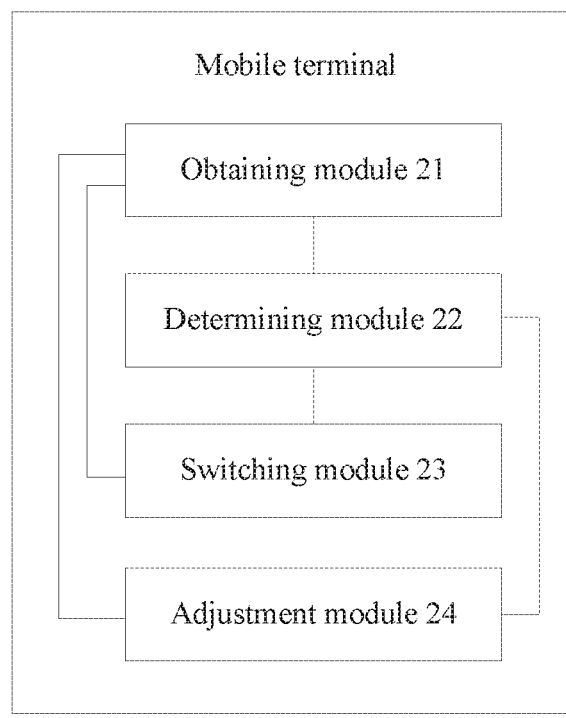
FIG. 9 is a second schematic structural diagram of a mobile terminal according to an embodiment of the present invention.

Optionally, with reference to FIG. 8, as shown in FIG. 9, the mobile terminal provided in this embodiment of the present invention may further include an adjustment module 24. The adjustment module 24 is configured to support the mobile terminal in performing S206 in the method process shown in FIG. 4A in the method embodiment.

The obtaining module 21, the determining module 22, the switching module 23, and the adjustment module 24 may be further configured to perform other processes of the technology described in this specification.

It should be noted that, all related content of each step in the foregoing method embodiments may be cited in function descriptions of a corresponding functional module. Details are not described herein again.

Figure 10:
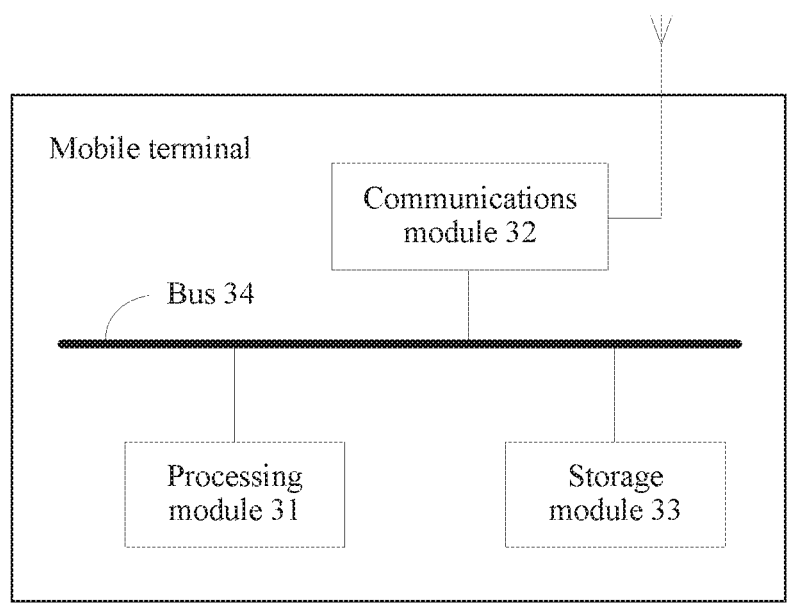
FIG. 10 is a third schematic structural diagram of a mobile terminal according to an embodiment of the present invention.

For example, when an integrated unit is used, a schematic structural diagram of a mobile terminal provided in an embodiment of the present invention is shown in FIG. 10. In FIG. 10, the mobile terminal includes a processing module 31 and a communications module 32. The processing module 31 is configured to control and manage actions of the mobile terminal. For example, the processing module 31 is configured to support the mobile terminal in performing the steps performed by the determining module 22, the switching module 23, and the adjustment module 24, and/or perform other processes of the technology described in this specification. The communications module 32 is configured to support the mobile terminal in interacting with a user, for example, the communications module 32 is configured to support the mobile terminal in performing the step performed by the obtaining module 21, and/or is configured to perform other processes of the technology described in this specification. As shown in FIG. 10, the mobile terminal may further include a storage module 33 and a bus 34, to store program code and data of the mobile terminal.

The processing module 31 may be a processor or controller of the mobile terminal. The processor or controller may be the processor 11 in the smartphone shown in FIG. 2. The processor or controller may implement or execute logical block diagrams, modules, and circuits in various examples described with reference to the content disclosed in the present invention. The processor or controller may be a central processing unit (central processing unit, CPU), a general purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor or controller may implement or execute various examples of logical blocks, modules, and circuits that are described with reference to the content disclosed in the present invention. The processor may also be a combination of computing functions, for example, a combination including one or more microprocessors or a combination of a DSP and a microprocessor.

The communications module 32 may be a transceiver, a transceiver circuit, a communications interface, or the like of the mobile terminal. The transceiver, the transceiver circuit, the communications interface, or the like may be the RF circuit 12 in the smartphone in the figure.

The storage module 33 may be a memory and the like of the mobile terminal, and the memory may be the memory 14 in the smartphone in the foregoing figure. The memory 33 may include a volatile memory (volatile memory) such as a random access memory (random access memory, RAM), or the memory 33 may include a non-volatile memory (non-volatile memory) such as a read-only memory (read-only memory, ROM), a flash memory (flash memory), a hard disk drive (hard disk drive, HDD), or a solid-state drive (solid-state drive, SSD), or the memory 33 may include a combination of the foregoing types of memories.

The bus 34 may be a peripheral component interconnect (peripheral component interconnect, PCI) bus, an extended industry standard architecture (extended industry standard architecture. EISA) bus, or the like. The bus 34 may be classified into an address bus, a data bus, a control bus, or the like. For ease of indication, the bus is indicated by using only one bold line in FIG. 10. However, it does not indicate that there is only one bus or only one type of bus.

Certainly, the mobile terminal in this embodiment may further include other components in the smartphone in FIG. 2, and details are not described herein again.

Optionally, based on FIG. 2, the mobile terminal provided in this embodiment of the present invention may further include various sensors used in the process of executing the method for controlling a screen of a mobile terminal in the embodiments of the present invention. For example, the sensors may include a barometer sensor, an acceleration sensor, an optical sensor, a capacitive sensor, and the like.

The barometer sensor is configured to detect an atmospheric pressure, and a moving height of the mobile terminal may be determined by using the atmospheric pressure.

The acceleration sensor may measure an acceleration value caused due to gravity, and an inclination angle of the mobile terminal relative to a horizontal plane may be calculated based on the acceleration value. A moving speed of the mobile terminal may be calculated by using a change of the acceleration value.

In this embodiment of the present invention, a motion parameter of the mobile terminal may be obtained by using the barometer sensor and the acceleration sensor.

The optical sensor may include a proximity optical sensor and a light sensor. The proximity optical sensor is configured to detect whether an object approaches or touches the mobile terminal, and detect whether a screen of the mobile terminal is blocked by an object. The light sensor is configured to detect ambient light namely, luminance of ambient light in an environment in which the mobile terminal is located. To be specific, in this embodiment of the present invention, the optical sensor may be used to detect whether the screen of the mobile terminal is blocked by an object.

The capacitive sensor may generate a capacitive increment when the user holds the mobile terminal by using a hand. To be specific, in this embodiment of the present invention, the capacitive sensor may be used to detect whether the mobile terminal is held.

For example, in this embodiment of the present invention, with reference to the system architecture of the Android operating system in FIG. 1, the processor of the mobile terminal in this embodiment of the present invention may be further configured to drive, at the kernel layer of the system architecture, the barometer sensor, the acceleration sensor, the optical sensor, the capacitive sensor, and the like, to perform data collection. In addition, the processor may be further configured to perform corresponding steps in the method embodiments based on the collected data.

An embodiment of the present invention provides a computer readable storage medium. The computer readable storage medium stores one or more programs. The one or more programs include a computer execution instruction. When the processor of the mobile terminal executes the computer execution instruction, the mobile terminal performs the method for controlling a screen of a mobile terminal in the method embodiments. For the specific method for controlling a screen of a mobile terminal, refer to the related descriptions in the method embodiments, and details are not described herein again.

The methods or algorithm steps described with reference to the content disclosed in the present invention may be implemented in a hardware manner, or may be implemented in a manner of executing a software instruction by a processor. The software instruction may include a corresponding software module. The software module may be stored in a RAM, a flash memory, a ROM, an erasable programmable read-only memory erasable programmable ROM, EPROM), an electrically erasable programmable read-only memory (electrically EPROM, EEPROM), a register, a hard disk, a removable hard disk, a compact disc read-only memory (CD-ROM), or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an ASIC.

The foregoing descriptions of implementations allow a person skilled in the art to clearly understand that, for the purpose of convenient and brief description, only division of the foregoing functional modules is used as an example for illustration. In actual application, the foregoing functions may be allocated to different modules and implemented according to a requirement, that is, an inner structure of an apparatus is divided into different functional modules to implement all or a part of the functions described above. For a specific working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is only an example. For example, the module or unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) or a processor to perform all or a part of the steps of the methods described in the embodiments of the present invention. The foregoing storage medium includes: any medium that can store program code, for example, a flash memory, a removable hard disk, a read-only memory, a random access memory, a magnetic disk, or an optical disc.

The foregoing descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for controlling a screen of a mobile terminal, comprising:
   obtaining a motion parameter of the mobile terminal when the screen is in an off state;
   determining that the motion parameter indicates that the mobile terminal is picked up when the screen is in the off state;
   obtaining a sight line parameter of a user after the mobile terminal is picked up and when the screen is in the off state;
   determining that the sight line parameter of the user indicates that a visual center of the user is on the screen by obtaining the sight line parameter of the user within a preset time after the mobile terminal is picked up; and
   switching the screen from the off state to an on state when the visual center of the user is on the screen within the preset time after the mobile terminal is picked up.

2. The method of claim 1, wherein the motion parameter corresponds to a speed of the mobile terminal.

3. The method of claim 2, further comprising:
   comparing the speed of the mobile terminal to a threshold; and
   determining that the mobile terminal is picked up when the speed of the mobile terminal exceeds the threshold.

4. The method of claim 1, wherein the motion parameter corresponds to a moving height of the mobile terminal.

5. The method of claim 4, further comprising:
   comparing the moving height of the mobile terminal to a threshold; and
   determining that the mobile terminal is picked up when the moving height of the mobile terminal exceeds the threshold.

6. The method of claim 1, wherein the motion parameter corresponds to an angle of the mobile terminal.

7. The method of claim 6, further comprising:
comparing the angle of the mobile terminal to a threshold; and
determining that the mobile terminal is picked up when the angle exceeds the threshold.

8. The method of claim 6, wherein the angle of the mobile terminal comprises an angle between a plane of the screen and a plane of eyes of the user.

9. A mobile terminal, comprising:
a processor;
a screen coupled to the processor; and
a memory coupled to the processor, wherein the memory is configured to store instructions that, when executed by the processor, cause the mobile terminal to:
  detect that the mobile terminal is picked up when the screen is in an off state;
  detect that a visual center of a user is on the screen when the screen is in the off state by obtaining a sight line parameter of the user within a preset time after the mobile terminal is picked up; and
  switch the screen from the off state to an on state when the visual center of the user is on the screen within the preset time after the mobile terminal is picked up.

10. The mobile terminal of claim 9, further comprising a sensor coupled to the processor and configured to detect a speed of the mobile terminal, wherein the processor is configured to determine that the mobile terminal is picked up when the speed of the mobile terminal exceeds a threshold.

11. The mobile terminal of claim 9, further comprising a sensor coupled to the processor and configured to detect a moving height of the mobile terminal, wherein the processor is configured to determine that the mobile terminal is picked up when the moving height of the mobile terminal exceeds a threshold.

12. The mobile terminal of claim 9, further comprising a sensor coupled to the processor and configured to detect an angle of the mobile terminal, wherein the processor is configured to determine that the mobile terminal is picked up when the angle of the mobile terminal exceeds a threshold.

13. The mobile terminal of claim 12, wherein the angle of the mobile terminal comprises an angle between a plane of the screen and a plane of eyes of the user.

14. The mobile terminal of claim 9, further comprising a camera coupled to the processor, wherein the camera is configured to obtain an image of the user, and wherein the processor is configured to analyze the image of the user to determine the visual center of the user.

15. The mobile terminal of claim 14, wherein the visual center of the user is based on eye tracking of the user.

16. The mobile terminal of claim 14, wherein the visual center of the user is based on analyzing a facial image of the user.

* * * * *